(12) United States Patent
Kim et al.

(10) Patent No.: US 12,395,915 B2
(45) Date of Patent: Aug. 19, 2025

(54) METHOD AND DEVICE FOR REPORTING INFORMATION RELATED TO HANDOVER IN NEXT GENERATION MOBILE COMMUNICATION SYSTEM

(71) Applicant: Samsung Electronics Co., Ltd., Suwon-si (KR)

(72) Inventors: Sangbum Kim, Suwon-si (KR); Sangyeob Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 122 days.

(21) Appl. No.: 18/021,985

(22) PCT Filed: Jan. 14, 2022

(86) PCT No.: PCT/KR2022/000711
§ 371 (c)(1),
(2) Date: Feb. 17, 2023

(87) PCT Pub. No.: WO2022/154561
PCT Pub. Date: Jul. 21, 2022

(65) Prior Publication Data
US 2023/0370933 A1 Nov. 16, 2023

(30) Foreign Application Priority Data
Jan. 14, 2021 (KR) .................. 10-2021-0005436

(51) Int. Cl.
*H04W 36/30* (2009.01)
*H04W 36/00* (2009.01)
*H04W 36/08* (2009.01)

(52) U.S. Cl.
CPC ..... *H04W 36/305* (2018.08); *H04W 36/0019* (2023.05); *H04W 36/0069* (2018.08);
(Continued)

(58) Field of Classification Search
CPC .......... H04W 36/305; H04W 36/0079; H04W 36/00837; H04W 36/362; H04W 36/185; H04W 24/10
See application file for complete search history.

(56) References Cited

U.S. PATENT DOCUMENTS

2020/0314716 A1 10/2020 Kim et al.
2022/0015061 A1 1/2022 Kim et al.
(Continued)

FOREIGN PATENT DOCUMENTS

KR 10-2020-0049139 A 5/2020
WO 2022/031199 A1 2/2022

OTHER PUBLICATIONS

Vivo, 'Discussion on SON enhancements for DAPS HO', R2-2009683, 3GPP TSG RAN WG2 Meeting, #112 electronic, Online, Oct. 23, 2020.
(Continued)

*Primary Examiner* — Barry W Taylor
(74) *Attorney, Agent, or Firm* — Jefferson IP Law, LLP

(57) ABSTRACT

The present disclosure proposes a method and a device for reporting information related to handover in a next generation mobile communication system. A method performed by a terminal in a wireless communication system according to an embodiment of the present disclosure may comprise the steps of acquiring configuration information related to dual active protocol stack (DAPS) handover, after execution of the DAPS handover is triggered on the basis of the configuration information, identifying failure in a radio link between the terminal and a source cell, and transmitting information on the failure in the radio link.

13 Claims, 21 Drawing Sheets

(52) U.S. Cl.
CPC . *H04W 36/0079* (2018.08); *H04W 36/00837* (2018.08); *H04W 36/08* (2013.01); *H04W 36/30* (2013.01)

(56) References Cited

U.S. PATENT DOCUMENTS

| | | | | |
|---|---|---|---|---|
| 2022/0386204 | A1* | 12/2022 | Parichehrehteroujeni | .................... H04W 76/19 |
| 2023/0189112 | A1* | 6/2023 | Wu | ................. H04W 36/00837 455/437 |
| 2023/0262542 | A1* | 8/2023 | Chang | ................... H04W 24/02 370/331 |
| 2024/0015610 | A1* | 1/2024 | Fang | ................... H04W 36/362 |

OTHER PUBLICATIONS

Sharp, 'Discussion on RLF report in CHO and DAPS case', R2-2009632, 3GPP TSG RAN WG2#112 e-Meeting, Online, Oct. 23, 2020.

CATT, 'Discussion on CHO and DAPS Mobility Enhancement', R2-2008844, 3GPP TSG-RAN WG2 Meeting #112 electronic, Online, Oct. 23, 2020.

NTT Docomo, Inc., 'Discussion on rel-17 Radio Link Failure Report for HO related aspects', R2-2010509, 3GPP TSG-RAN WG2 #112-e, Electronic Meeting Oct. 23, 2020.

3GPP TR 37.816 V16.0.0, 3rd Generation Partnership Project; Technical Specification Group Radio Access Network; Study on RAN-centric data collection and utilization for LTE, and NR, (Release 16), Jul. 23, 2019.

Qualcomm Incorporated, Successful Handover Report, R2-2009397, 3GPP TSG-RAN WG2 Meeting #112-e, Electronic, Oct. 22, 2020, XP051942355.

Ericsson, Summary of AI 8.13.2.1—Handover related SON aspects, R2-2010995, 3GPP TSG-RAN WG2 #112-e, Electronic meeting, Nov. 16, 2020, XP052255579.

Extended European Search Report dated Feb. 28, 2024, issued in European Patent Application No. 22739754.4.

\* cited by examiner

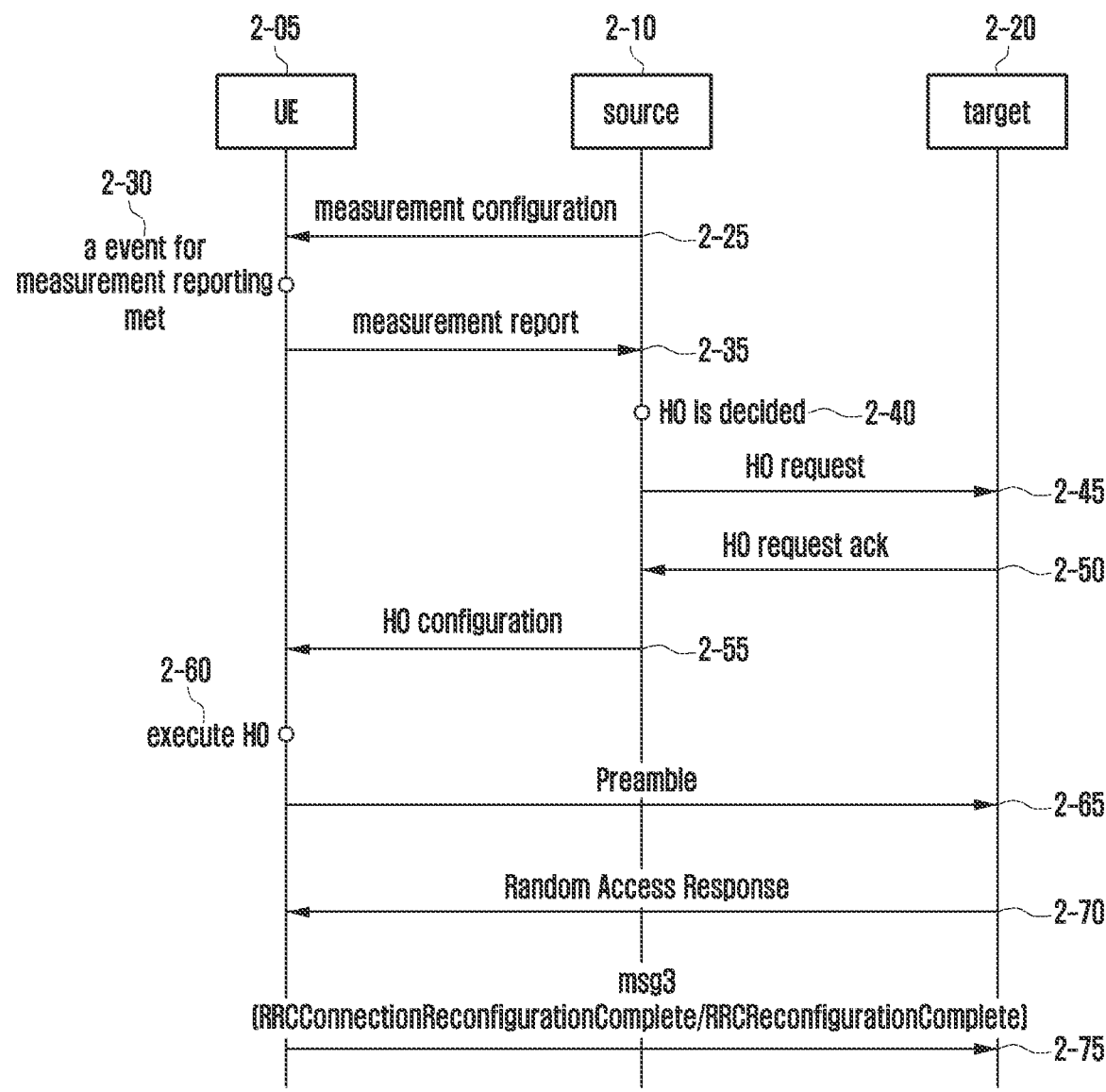

Source protocol
Step 1: Before HO (3-05)

Step 4: During the transmission of HO complete complete (3-20)

Step 5: After RAR (3-25)

Target protocol
Step 6: After release of source (3-30)

METHOD AND DEVICE FOR REPORTING INFORMATION RELATED TO HANDOVER IN NEXT GENERATION MOBILE COMMUNICATION SYSTEM

TECHNICAL FIELD

The disclosure relates to operations of a terminal and a base station in a mobile communication system and, more particularly, to a method and apparatus for reporting handover-related information.

BACKGROUND ART 5G mobile communication technology defines a wide frequency band to enable fast transmission speed and new services, and can be implemented not only in a sub-6 GHz frequency band ("sub 6 GHz") such as 3.5 GHz but also in an ultra-high frequency band ("above 6 GHz") called mmWave such as 28 GHz or 39 GHz. In addition, 6G mobile communication technology called "beyond 5G system" is being considered for implementation in a terahertz (THz) band (e.g., band of 95 GHz to 3 THz) to achieve transmission speed that is 50 times faster and ultra-low latency that is reduced to 1/10 compared with 5G mobile communication technology.

In the early days of 5G mobile communication technology, to meet service support and performance requirements for enhanced mobile broadband (eMBB), ultra-reliable and low-latency communication (URLLC), and massive machine-type communications (mMTC), standardization has been carried out regarding beamforming for mitigating the pathloss of radio waves and increasing the propagation distance thereof in the mmWave band, massive MIMO, numerology for efficient use of ultra-high frequency resources (e.g., operating multiple subcarrier spacings), dynamic operations on slot formats, initial access schemes to support multi-beam transmission and broadband, definition and operation of bandwidth parts (BWP), new channel coding schemes such as low density parity check (LDPC) codes for large-capacity data transmission and polar codes for reliable transmission of control information, L2 pre-processing, and network slicing for providing a dedicated network specialized for a specific service.

Currently, discussions are underway to improve 5G mobile communication technology and enhance performance thereof in consideration of the services that the 5G mobile communication technology has initially intended to support, and physical layer standardization is in progress for technologies such as V2X that aims to help a self-driving vehicle to make driving decisions based on its own location and status information transmitted by vehicles and to increase user convenience, new radio unlicensed (NR-U) for the purpose of system operation that meets various regulatory requirements in unlicensed bands, low power consumption scheme for NR terminals (UE power saving), non-terrestrial network (NTN) as direct terminal-satellite communication to secure coverage in an area where communication with a terrestrial network is not possible, and positioning.

In addition, standardization in radio interface architecture/protocol is in progress for technologies such as intelligent factories (industrial Internet of things, IIoT) for new service support through linkage and convergence with other industries, integrated access and backhaul (IAB) that provides nodes for network service area extension by integrating and supporting wireless backhaul links and access links, mobility enhancement including conditional handover and dual active protocol stack (DAPS) handover, 2-step random access (2-step RACH for NR) that simplifies the random access procedure; and standardization in system architecture/service is also in progress for the 5G baseline architecture (e.g., service based architecture, service based interface) for integrating network functions virtualization (NFV) and software defined network (SDN) technologies, and mobile edge computing (MEC) where the terminal receives a service based on its location.

When such a 5G mobile communication system is commercialized, connected devices whose number is explosively increasing will be connected to the communication networks; accordingly, it is expected that enhancement in function and performance of the 5G mobile communication system and the integrated operation of the connected devices will be required. To this end, new research will be conducted regarding 5G performance improvement and complexity reduction, AI service support, metaverse service support, and drone communication by utilizing extended reality (XR=AR+VR+MR) for efficiently supporting augmented reality and virtual reality, artificial intelligence (AI), and machine learning (ML).

Further, such advancement of 5G mobile communication systems will be the basis for the development of technologies such as new waveforms for ensuring coverage in the terahertz band of 6G mobile communication technology, full dimensional MIMO (FD-MIMO), multi-antenna transmission such as array antenna or large scale antenna, metamaterial-based lenses and antennas for improved coverage of terahertz band signals, high-dimensional spatial multiplexing using orbital angular momentum (OAM), reconfigurable intelligent surface (RIS) technique, full duplex technique to improve frequency efficiency and system network of 6G mobile communication technology, satellites, AI-based communication that utilizes artificial intelligence (AI) from the design stage and internalizes end-to-end AI support functions to realize system optimization, and next-generation distributed computing that realizes services whose complexity exceeds the limit of terminal computing capabilities by utilizing ultra-high-performance communication and computing resources.

DISCLOSURE OF INVENTION

Technical Problem

An object of the disclosure is to provide a method and apparatus for reporting handover-related information in a next-generation mobile communication system.

In particular, the disclosure is characterized in that storing and reporting information on at least one of a radio link failure (RLF) in the source cell or a handover failure in the target cell occurring in a dual active protocol stack (DAPS) handover (HO) process.

In addition, the disclosure proposes a method for reporting events/difficulties having occurred during the handover process to the base station through a successful HO report even if the handover is successful.

The technical objectives to be achieved in the disclosure are not limited to those mentioned above, and other technical objectives not mentioned will be clearly understood by those skilled in the art to which the disclosure belongs from the following description.

Solution to Problem

In the disclosure for solving the above problems, a method performed by a terminal in a wireless communication system may include obtaining configuration information related to a dual active protocol stack (DAPS) handover, identifying, after execution of the DAPS handover is triggered based on the configuration information, a failure of a radio link between the terminal and a source cell, and transmitting information on the failure of the radio link.

Further, in the method according to an embodiment of the disclosure, the information on the failure of the radio link may include an indicator indicating that the failure of the radio link has occurred during execution of the DAPS handover.

Further, in the method according to an embodiment of the disclosure, the information on the failure of the radio link may be included in a successful handover report transmitted after the DAPS handover is successfully completed.

Further, in the method according to an embodiment of the disclosure, the information on the failure of the radio link may include information on a time from a time point when execution of the DAPS handover is triggered by obtaining the configuration information to a time point when the failure of the radio link has occurred.

Further, the method according to an embodiment of the disclosure may further include identifying a failure of the DAPS handover, and the information on the failure of the radio link may include an indicator indicating whether the failure of the radio link has occurred before the failure of the DAPS handover.

Further, in the method according to an embodiment of the disclosure, the information about the failure of the radio link may include information indicating a time between the failure of the DAPS handover and the failure of the radio link.

In an embodiment of the disclosure, a method performed by a base station in a wireless communication system may include transmitting configuration information related to a dual active protocol stack (DAPS) handover to a terminal, and receiving information on a failure of a radio link between the terminal and a source cell, which occurs after execution of the DAPS handover is triggered based on the configuration information.

In an embodiment of the disclosure, a terminal in a wireless communication system may include a transceiver to transmit and receive signals, and a controller that is configured to control obtaining configuration information related to a dual active protocol stack (DAPS) handover, identifying, after execution of the DAPS handover is triggered based on the configuration information, a failure of a radio link between the terminal and a source cell, and transmitting information on the failure of the radio link.

In an embodiment of the disclosure, a base station in a wireless communication system may include a transceiver to transmit and receive signals, and a controller that is configured to control transmitting configuration information related to a dual active protocol stack (DAPS) handover to a terminal, and receiving information on a failure of a radio link between the terminal and a source cell, which occurs after execution of the DAPS handover is triggered based on the configuration information.

Advantageous Effects of Invention

According to an embodiment of the disclosure, when the terminal experiences a radio link failure (RLF) in the source cell and experiences a handover failure in the target cell during a dual active protocol stack (DAPS) handover (HO) process, the terminal may store and report information on the two successive failures.

In addition, according to an embodiment of the disclosure, when the terminal experiences a radio link failure (RLF) in the source cell and succeeds in handover to the target cell during a dual active protocol stack (DAPS) handover (HO) process, it may store and report information about the RLF in the source cell.

In addition, according to an embodiment of the disclosure, even if the handover is successful, events/difficulties having occurred during the handover process can be reported to the base station through a successful HO report. Through this, handover can be improved.

The effects obtainable in the disclosure are not limited to those mentioned above, and other effects not mentioned will be clearly understood by those skilled in the art to which the disclosure belongs from the following description.

BRIEF DESCRIPTION OF DRAWINGS

FIG. 2 is a diagram showing a sequence of operations of UE, source cell, and target cell for executing regular handover in a mobile communication system according to an embodiment of the disclosure.

MODE FOR THE INVENTION

In the following description of the disclosure, if it is determined that a detailed description of a related known function or configuration may unnecessarily obscure the subject matter of the disclosure, the detailed description thereof will be omitted. Hereinafter, embodiments of the disclosure will be described in detail with reference to the accompanying drawings. The disclosure is described based on the LTE system, but it is also applied to other mobile communication systems such as NR being a next-generation mobile communication system. As an example, in the disclosure, the eNB in LTE corresponds to the gNB in NR, and the MME in LTE corresponds to the AMF in NR.

Figure 1:
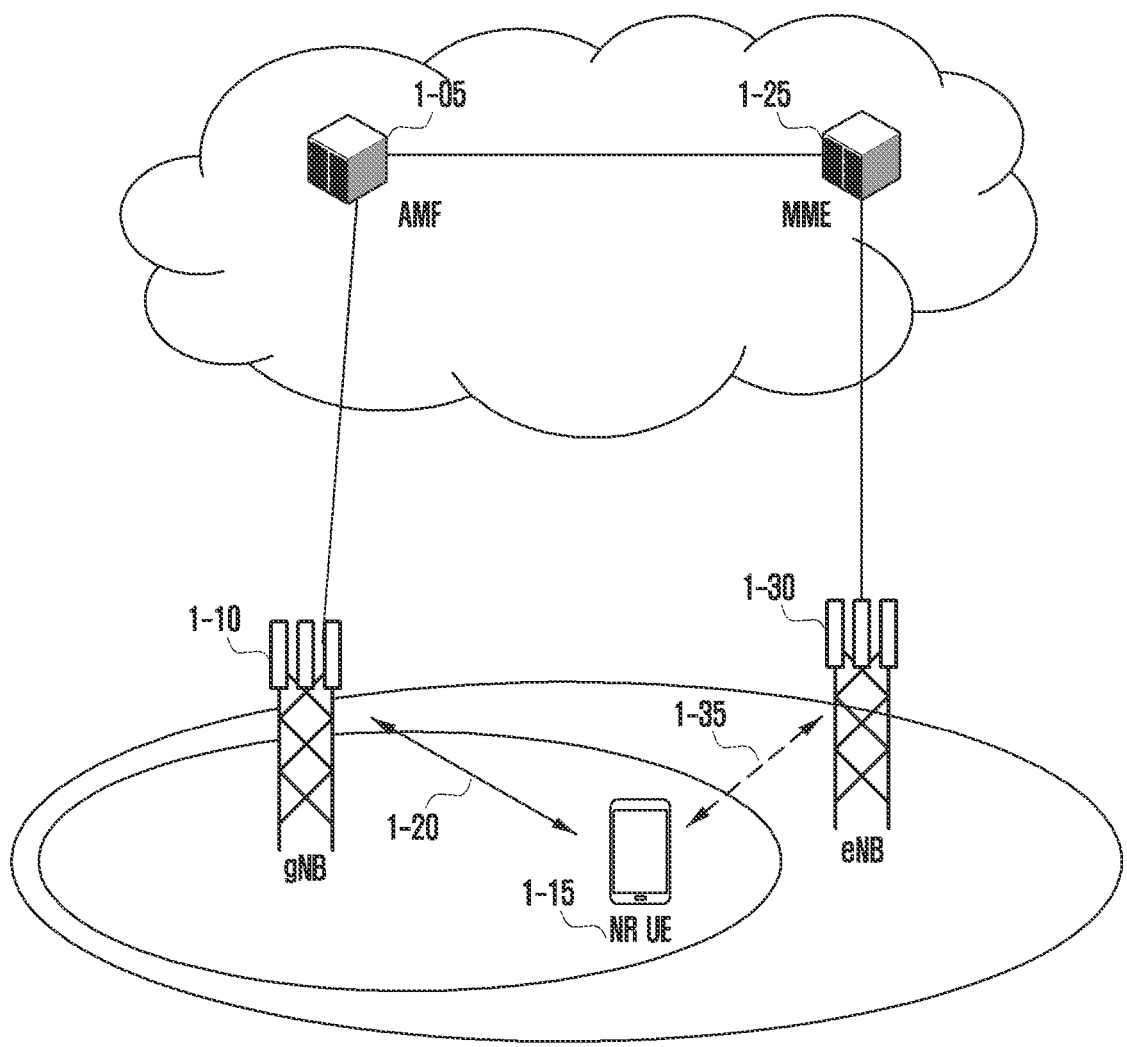
FIG. 1 is a diagram illustrating the architecture of a next-generation mobile communication system according to an embodiment of the disclosure.

FIG. 1 is a diagram illustrating the architecture of a next-generation mobile communication system according to an embodiment of the disclosure.

With reference to FIG. 1, the radio access network of a next-generation mobile communication system (new radio, NR) may be composed of a new radio node B (hereinafter, gNB) 1-10 and an AMF (new radio core network) 1-05. A new radio user equipment (hereinafter, NR UE or terminal) 1-15 may connect to an external network through the gNB 1-10 and the AMF 1-05.

In FIG. 1, the gNB corresponds to an evolved node B (eNB) of the existing LTE system. The gNB may be connected to the NR UE through a radio channel, and it can provide a more superior service than that of the existing node B (1-20). As all user traffic is serviced through shared channels in the next-generation mobile communication system, there is a need for an entity that performs scheduling by collecting status information, such as buffer states, available transmission power states, and channel states of UEs, and the gNB 1-10 takes charge of this. In a typical situation, one gNB may control a plurality of cells. To implement ultra-high-speed data transmission compared with current LTE, a bandwidth beyond the existing maximum bandwidth may be utilized, and a beamforming technology may be additionally combined with orthogonal frequency division multiplexing (OFDM) serving as a radio access technology. Further, an adaptive modulation and coding (AMC) scheme determining a modulation scheme and channel coding rate to match the channel state of the UE may be applied. The AMF 1-05 may perform functions such as mobility support, bearer configuration, and QoS configuration. The AMF 1-05 is an entity taking charge of not only mobility management but also various control functions for the UE, and may be connected to a plurality of base stations. In addition, the next-generation mobile communication system may interwork with the existing LTE system, and the AMF 1-05 may be connected to the MME 1-25 through a network interface. The MME may be connected to an eNB 1-30 being a legacy base station. The UE supporting LTE-NR dual connectivity may transmit and receive data while maintaining connections to both the gNB and the eNB (1-35).

FIG. 2 is a diagram showing a sequence of operations of UE, source cell, and target cell for executing regular handover in a mobile communication system according to an embodiment of the disclosure.

The UE 2-05 may receive a specific RRC message including measurement configuration information from the source cell 2-10 (2-25). The UE may measure the signal quality of the serving cell and neighbor cells by applying the measurement configuration information, and it may, on a periodic basis or occurrence of a set event (2-30), report the collected cell measurement information to the source cell (2-35). The source cell may determine whether to trigger a regular handover operation based on the reported cell measurement information (2-40). For example, when cell measurement information is reported due to occurrence of event A3 (neighbor becomes offset better than SpCell), the source cell may determine to trigger regular handover. Upon determining to trigger regular handover, the source cell may make a regular handover request to one target cell 2-20 by using a specific inter-node message (2-45). Upon receiving the request, the target cell may accept it and transmit, in reply to the handover request, a response or handover configuration information necessary for the regular handover operation to the source cell (2-50). The source cell may include the handover configuration information received from the target cell and additional configuration information in a specific RRC message and transmit the RRC message to the UE (2-55). The configuration information may include target cell ID, frequency information, configuration information necessary for random access operation to the target cell (dedicated preamble information, dedicated radio resource information, etc.), transmission power information, cell-radio network temporary identifier (C-RNTI) information used in the target cell, or the like.

Upon receiving the handover configuration information, the UE may immediately initiate a random access process to the target cell and start the T304 timer (2-60). At the same time, data transmission and reception with the serving cell may be stopped. This is because the UE has a single protocol stack. The UE may transmit the provided preamble (2-65). If a dedicated preamble is not provided, one of the preambles used on a contention basis may be transmitted. Upon receiving the preamble, the target cell may transmit a random access response (RAR) message to the UE (2-70). The UE may transmit msg3 to the target cell by using UL grant information included in the RAR (2-75). Msg3 may include an RRCConnectionReconfigurationComplete message in the case of the LTE system, and may include an RRCReconfigurationComplete message in the case of the NR system. If the random access process is successfully completed, it may be considered that the regular handover is successfully completed, and the running T304 timer may be stopped. If the regular handover is not successfully completed until the T304 timer expires, it may be regarded as a handover failure and an RLF may be declared.

FIGS. 3A to 3F are diagrams illustrating a process of utilizing dual active protocol stacks during handover execution in a mobile communication system according to an embodiment of the disclosure.

When performing a regular handover, the UE may stop data transmission and reception to and from the source cell upon receiving handover configuration information, and may start data transmission and reception to and from the target cell after the handover process is successful. Hence, an interruption time may occur during a time period when data transmission or reception cannot be performed. If the UE has dual active protocol stacks, data transmission and reception to and from the source cell can be maintained during the time period. In the disclosure, handover considering the UE capability described above is referred to as dual active protocol stack (DAPS) handover. When DAPS handover is configured, the UE may be able to simultaneously receive downlink data from the source cell and the target cell. However, since simultaneous uplink data transmission to the source cell and the target cell is difficult in the case of insufficient UE transmission power or signal interference, it may be possible only when specific conditions are satisfied. To minimize UE complexity, during DAPS handover execution, uplink data transmission may be allowed on only one link, and the uplink through which data transmission is performed may be switched from the source cell to the target cell at a specific time point.

The activation state of the dual protocol stacks corresponding to the source cell and the target cell and the operation of the UE may be different at each major specific time point.

Figure 3A:
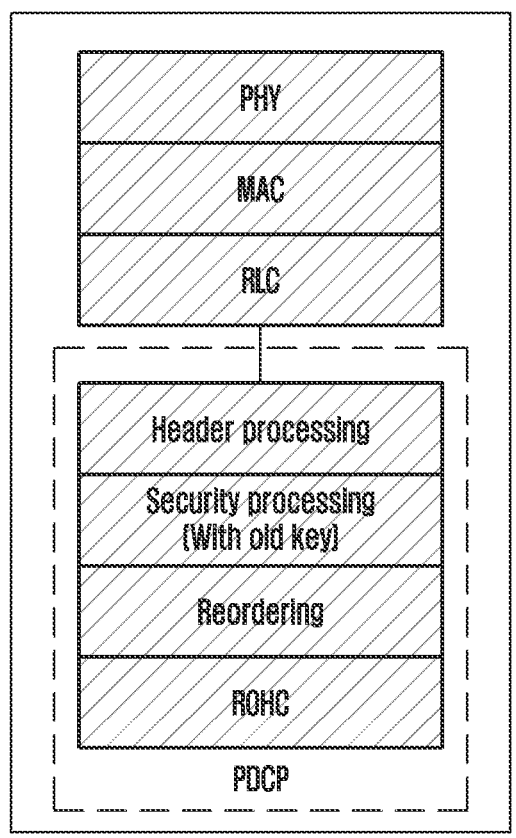
FIG. 3A illustrates a protocol stack corresponding to the source cell before handover execution in a mobile communication system according to an embodiment of the disclosure.

FIG. 3A illustrates a protocol stack corresponding to the source cell before handover execution in a mobile communication system according to an embodiment of the disclosure. Before handover execution (3-05), the UE can use only the protocol stack corresponding to the source cell.

Figure 3B:
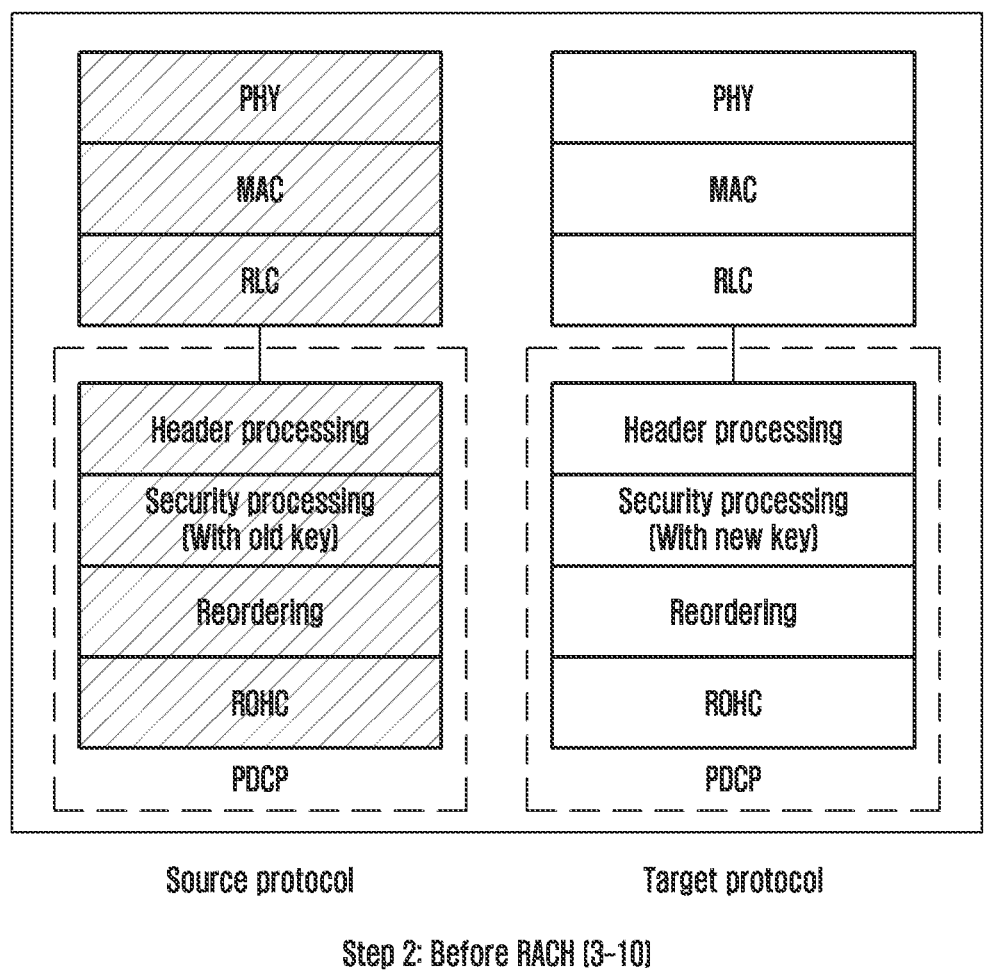
FIG. 3B illustrates protocol stacks corresponding to the source cell and the target cell before RACH is performed to the target cell after DAPS handover configuration information is provided to the UE in a mobile communication system according to an embodiment of the disclosure.

FIG. 3B illustrates protocol stacks corresponding to the source cell and the target cell before RACH is performed to the target cell after DAPS handover configuration information is provided to the UE in a mobile communication system according to an embodiment of the disclosure. Before RACH is performed to the target cell after DAPS handover configuration information is provided to the UE (3-10), when the UE receives DAPS handover configuration information through an RRCReconfiguration message, it can compose a protocol stack corresponding to the target cell. However, the UE can still use only the protocol stack corresponding to the source cell. The protocol stack corresponding to the target cell may be in an inactive state.

Figure 3C:
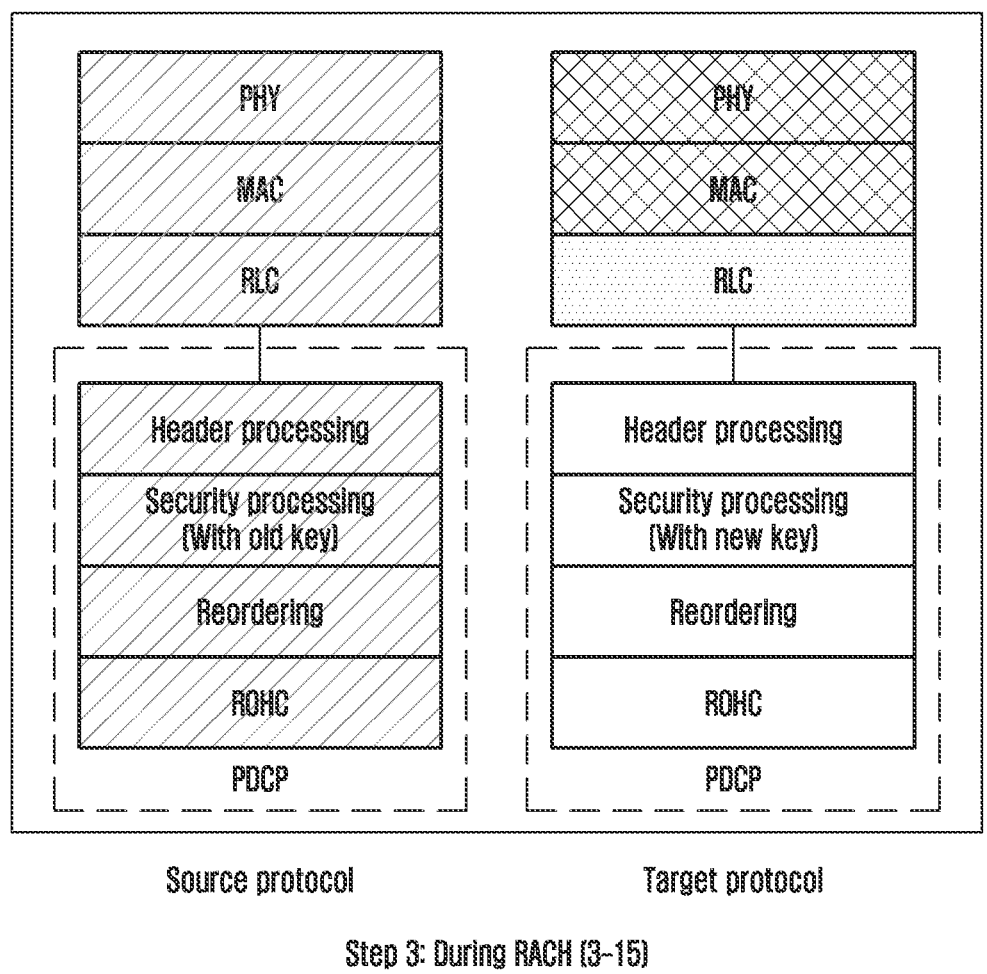
FIG. 3C illustrates protocol stacks corresponding to the source cell and the target cell during a period when the UE configured with DAPS handover performs RACH in a mobile communication system according to an embodiment of the disclosure.

FIG. 3C illustrates protocol stacks corresponding to the source cell and the target cell during a period when the UE configured with DAPS handover performs RACH in a mobile communication system according to an embodiment of the disclosure. During the RACH execution period (3-15), when the RACH operation is started, at least the PHY layer and the MAC layer are activated in the protocol stack corresponding to the target cell, so that the RACH operation can be performed. At this time, the UE can still maintain data transmission and reception to and from the source cell.

Figure 3D:
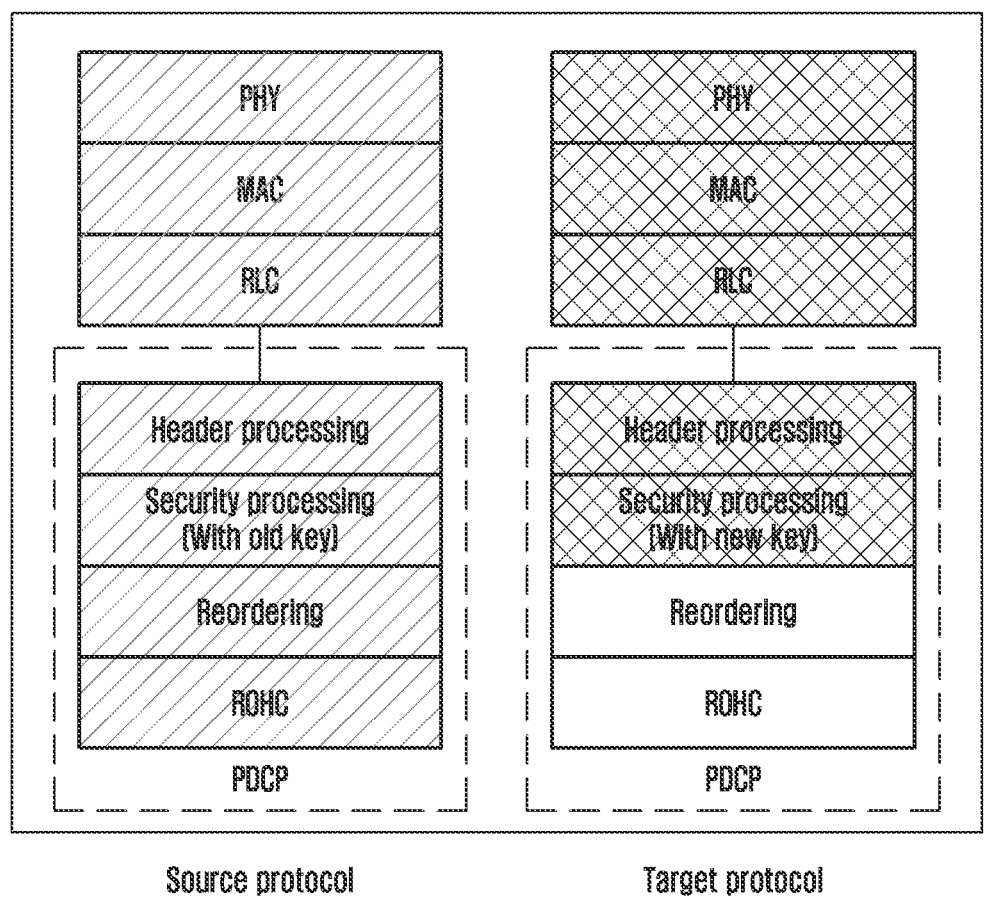
FIG. 3D illustrates protocol stacks corresponding to the source cell and the target cell at a time when the UE transmits a HO completion message to the target cell in a mobile communication system according to an embodiment of the disclosure.

FIG. 3D illustrates protocol stacks corresponding to the source cell and the target cell at a time when the UE transmits a HO completion message to the target cell in a mobile communication system according to an embodiment of the disclosure. When the time point at which the UE transmits a HO completion message to the target cell arrives (3-20), the UE must be able to process the HO completion message, which is a signaling radio bearer, by activating at least some functions of the PHY layer, MAC layer, RLC layer, and PDCP layer in the protocol stack corresponding to the target cell. The UE may transmit uplink data to the source cell at least before transmitting the HO complete message to the target cell.

Figure 3E:
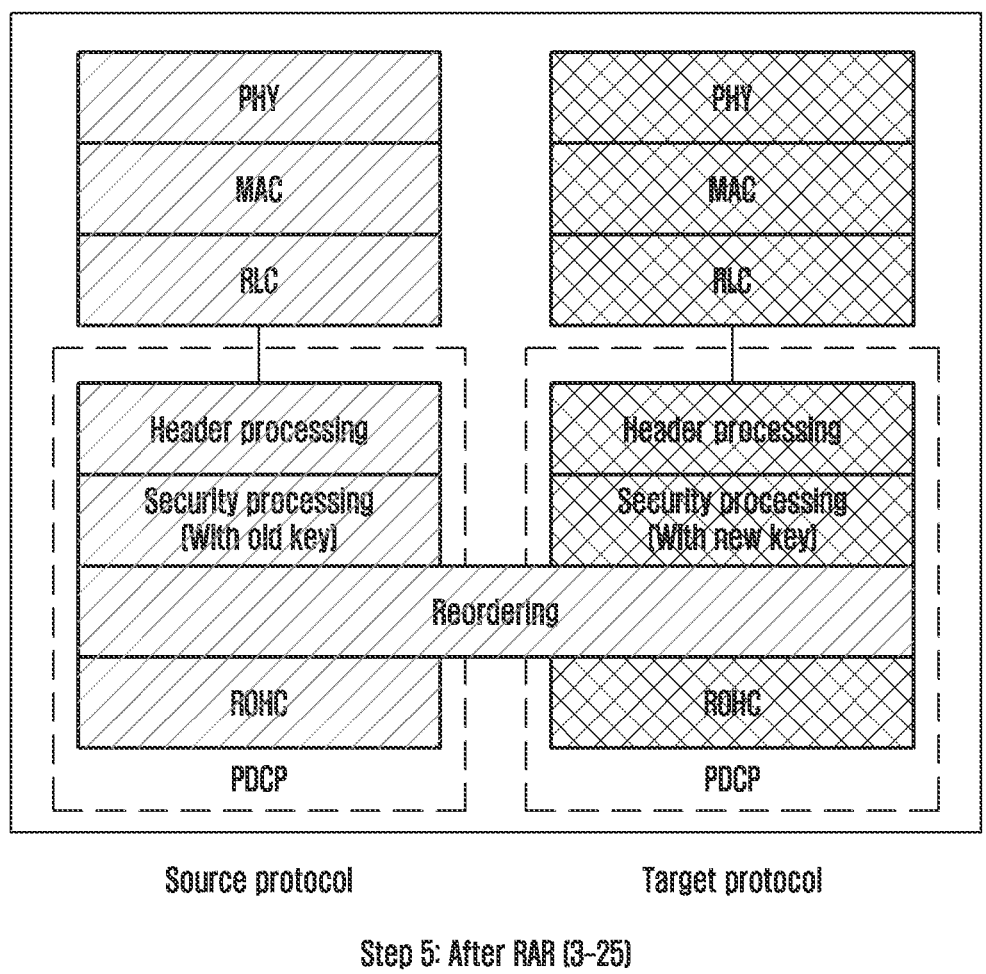
FIG. 3E illustrates activated protocol stacks corresponding to the source cell and the target cell after the UE receives an RAR from the target cell in a mobile communication system according to an embodiment of the disclosure.

FIG. 3E illustrates activated protocol stacks corresponding to the source cell and the target cell after the UE receives an RAR from the target cell in a mobile communication system according to an embodiment of the disclosure. After the UE receives an RAR from the target cell (3-25), all of the dual active protocol stacks are activated. The UE may maintain data transmission and reception to and from the source cell until a specific time point arrives after RAR reception. In addition, a time point at which the UE can maintain downlink data reception from the source cell and a time point at which the UE can maintain uplink data transmission to the source cell may be different. The UE can transmit uplink data to the source cell until transmitting a HO complete message to the target cell, but reception of downlink data is possible even after that.

Figure 3F:
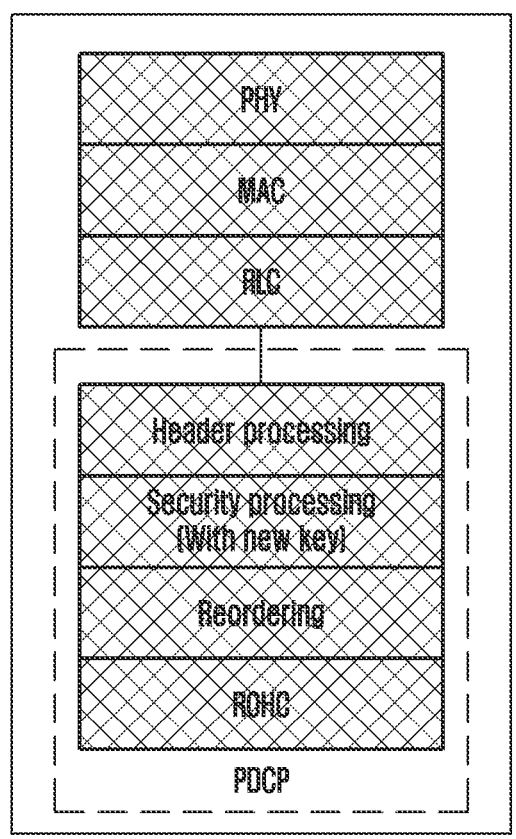
FIG. 3F illustrates a protocol stack corresponding to the target cell after the UE releases the source cell in a mobile communication system according to an embodiment of the disclosure.

FIG. 3F illustrates a protocol stack corresponding to the target cell after the UE releases the source cell in a mobile communication system according to an embodiment of the disclosure. After the UE releases the source cell (3-30), it can also release the protocol stack corresponding to the source cell. After that, the UE can use only the protocol stack corresponding to the target cell.

Figure 4:
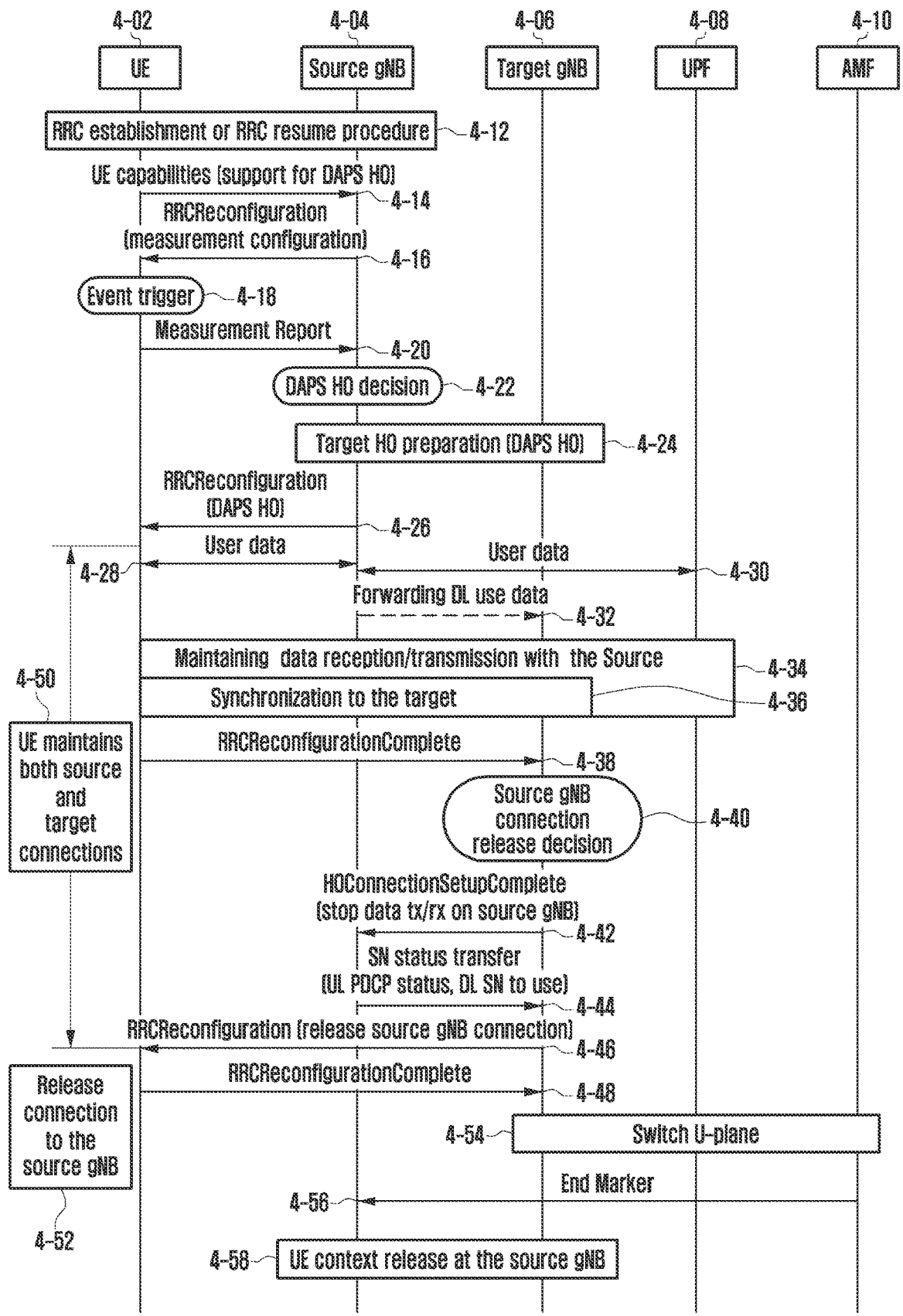
FIG. 4 is a diagram showing a sequence of operations of UE, source gNB, target gNB, UPF, and AMF for executing DAPS handover in a mobile communication system according to an embodiment of the disclosure.

FIG. 4 is a diagram showing a sequence of operations of UE, source gNB, target gNB, UPF, and AMF for executing DAPS handover in a mobile communication system according to an embodiment of the disclosure.

The UE 4-02 may switch to connected mode with the source gNB 4-04 through an RRC establishment or RRC resume process (4-12). The UE capable of supporting DAPS handover may report to the source gNB that it supports DAPS handover (4-14). The source gNB may configure a measurement configuration to the UE for the purpose of supporting mobility by using an RRCReconfiguration message (4-16). When a measurement reporting event is triggered (4-18), the UE must report a measurement report to the source gNB (4-20). Upon receiving the measurement report, the source gNB 4-04 may determine to perform handover to a specific neighbor base station based on cell measurement information included in the measurement report (4-22). Then, the source gNB 4-04 may transmit a handover request message to the target gNB 4-06, and the target gNB 4-06 may transmit a corresponding response message to the source gNB 4-04 (4-24). The handover request message may include an indicator indicating that the UE will perform DAPS handover. The response message may include configuration information necessary for the UE 4-02 to access the target cell 4-06. The source gNB may transmit handover configuration information, ReconfigurationWithSync, etc. to the UE by using RRCReconfiguration (4-26). Upon receiving the message, the UE starts a T304 or T304-like timer. If an RRCReconfigurationComplete message is not successfully transmitted to the target cell until the above timer expires, the handover may be considered to have failed. The handover configuration information may include an indicator indicating DAPS based handover. Upon receiving the indicator, the UE maintains data transmission and reception to and from the source cell until a specific point in time after transmitting a first preamble to the target cell (4-28, 4-34). UE user data transmitted to and received from the source cell is delivered to the end user through a user plane function (UPF) 4-08 (4-30). The source cell may forward downlink data of the UE to the target cell (4-32). This is because the signal quality of the link to the source cell may rapidly deteriorate, making it difficult to transmit or receive any more data. The UE may perform random access to the target cell (4-36). The UE may transmit an RRCReconfigurationComplete message to the target cell (4-38). If the RRC message (e.g., RRCReconfigurationComplete message) is successfully delivered, this means that handover to the target cell has been successfully completed. The UE may perform uplink data transmission to the source cell until the RRC message is successfully transmitted. When the UE receives a UL grant (uplink scheduling information) from the target cell, it can switch the uplink to the target cell. Upon receiving the RRCReconfigurationComplete message, the target cell may determine to release the connection between the UE and the source cell (4-40). The target cell may transmit a connection release request to the source cell (4-42). Upon receiving the request, the source cell may stop transmitting and receiving data to and from the UE. The source cell may provide SN status transfer to the target cell (4-44). This information is used by the target cell to smoothly perform data transmission and reception to and from the UE. The target cell may instruct the UE to release the connection to the source cell by using a specific RRC message (4-46). Upon receiving the message, the UE may release the connection to the source cell (4-52) and transmit a response message in reply to the above message (4-48). As another option, the UE may implicitly release the connection to the source cell at the time of successfully transmitting the RRCReconfigurationComplete message to the target cell or after a specific offset time. The target cell may transmit a U-plane switching request to the AMF 4-10 (4-54). Upon receiving the request, the AMF may transmit an End Marker to the source cell (4-56). The source cell may release the UE context for the UE (4-58).

Figure 5:
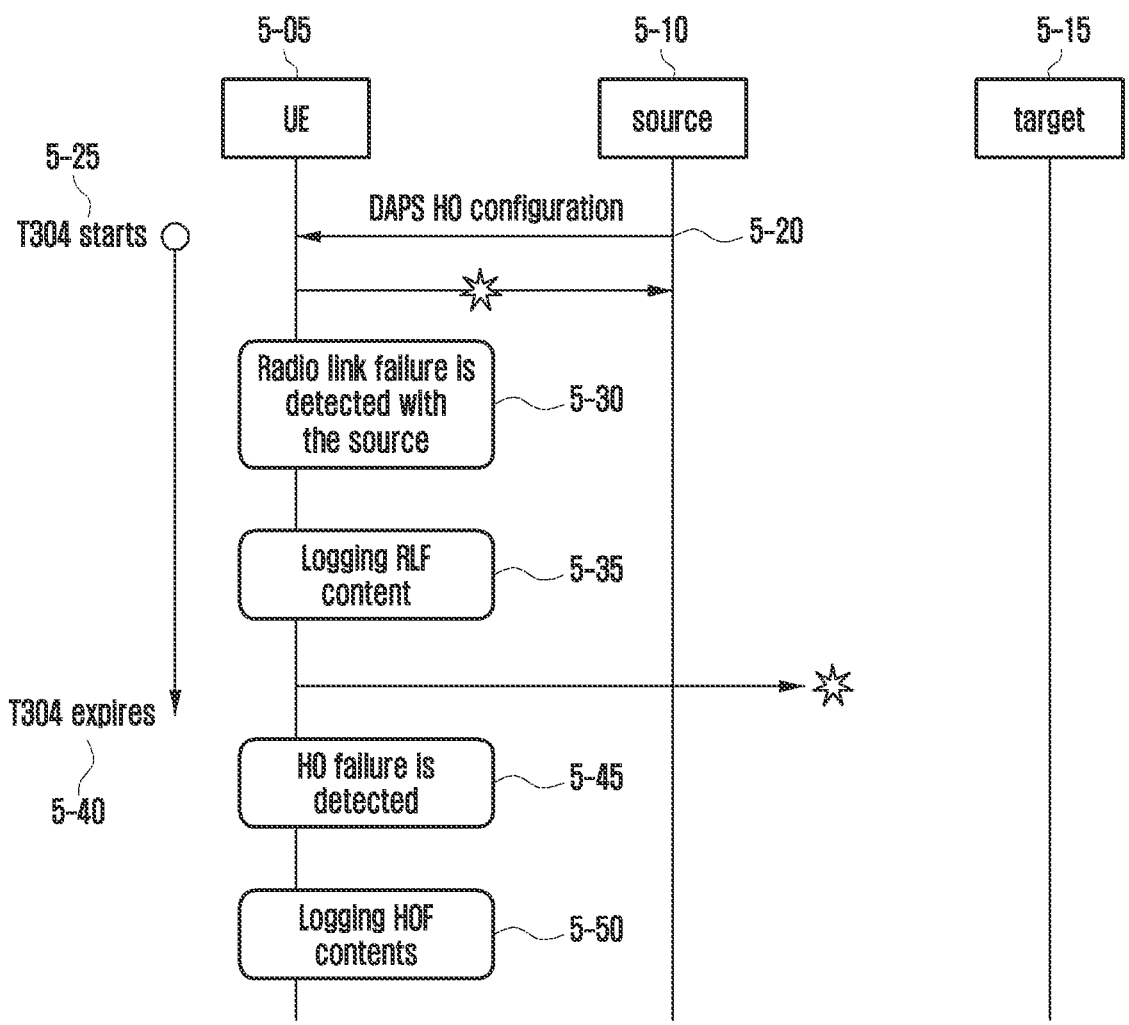
FIG. 5 is a diagram showing a sequence of operations of UE, source gNB, and target gNB for recording and reporting a DAPS handover failure in a mobile communication system according to an embodiment of the disclosure.

FIG. 5 is a diagram showing a sequence of operations of UE, source gNB, and target gNB for recording and reporting a DAPS handover failure in a mobile communication system according to an embodiment of the disclosure.

The disclosure proposes a method for storing and reporting, by the UE, information on two successive failures in case that, after DAPS HO is configured, an RLF occurs in the source cell and handover to the target cell also fails before the DAPS HO is completed (before information indicating release of the source cell is received from the target cell).

The UE 5-05 may receive DAPS HO configuration information from the source cell 5-10 (5-20). Upon receiving the configuration information, the UE may start the T304 timer (5-25) and perform DAPS HO. For example, the procedure for the UE to perform DAPS HO may be based on the above description with reference to FIG. 4. During the DAPS HO process, the UE may maintain data transmission and reception to and from the source cell, and may continuously perform radio link monitoring (RLM) operation on the source cell. If an RLF occurs for the source cell during the DAPS HO process (5-30), the UE may store specific information (5-35). In the related art, even if an RLF occurs for the source cell during a DAPS HO process, no information about the RLF is stored. The purpose of DAPS HO is to minimize the interruption time of data transmission and reception by simultaneously connecting the UE to the source cell and the target cell 5-15 during handover. If an RLF occurs in the source cell, the network needs to be aware that such a problem has occurred because the purpose cannot be achieved even if DAPS HO is configured.

The words "during the DAPS HO process" may mean a time interval from the time when the UE receives DAPS HO configuration information to the time when the target cell instructs the UE to release the connection to the source cell by using a specific RRC message. Alternatively, they may mean a time interval from the time when the UE receives DAPS HO configuration information to the time when the UE successfully transmits an RRCReconfigurationComplete message to the target cell.

When an RLF occurs in the source cell during the DAPS HO process, the UE may store information related thereto. At this time, an indicator indicating that the RLF has occurred may be included in the RLF report, or a portion of information included in the RLF report may be stored. Table 1 shows instances of information that may be stored in the RLF report according to an embodiment of the disclosure. In Table 1 below, among information that can be included in the RLF report, information that can be included when an RLF occurs in the source cell during the DAPS HO process is indicated by (1).

When an RLF occurs in the source cell and T304 expires (5-40), handover to the target cell may also fail. At this time, if a handover failure is detected (5-45), the UE may store information related to the handover failure (5-50). Among the information that may be included in the RLF report in Table 1 below, information that may be included when a failure of handover to the target cell is detected during the DAPS HO process is indicated by (2).

When storing information related to the failure, some information may be duplicated with information (e.g., c-RNTI-r16) that may be included when an RLF occurs in the source cell during the DAPS HO process. The duplicated information may be stored only once. For the same type of information (e.g., measResultLastServCell, measResultNeighCells, etc. in Table 1 below), information values stored for the two failures may be different. In this case, information need to be stored and reported for each failure.

Information on successive failures in the source cell and the target cell may be included in one RLF report and reported to the base station. Alternatively, two successive failures may be included in separate RLF reports and reported to the base station. If reported by separate RLF reports, a separate availability indicator may be defined. For example, the availability indicator may be included in RRCSetupComplete, RRCResumeComplete, RRCReetablishmentComplete, or RRCReconfigurationComplete, and may be used to indicate to the base station that the UE stores the above information. The base station having received the above information may forward the information to the source cell or self organizing/optimizing network (SON) server involved in the corresponding failure. The source cell or SON server may improve handover configuration information based on the information.

New information may be proposed in relation to an RLF occurring in the source cell. The time when an RLF has occurred in the source cell is also useful information for optimizing DAPS HO in the network. Hence, information on the time from when the UE receives DAPS HO configuration information from the source cell to when an RLF occurs in the source cell may be stored as new information. Or, information on the time between when an RLF occurs in the source cell and when a handover failure occurs in the target cell may be stored.

A specific indicator may be proposed so that the time order of an RLF occurring in the source cell and a handover failure occurring to the target cell can be identified.

For example, if this indicator is set, it may indicate that a handover failure has occurred after occurrence of an RLF. The opposite setting is also possible (e.g., if the indicator is set, it may mean that an RLF has occurred after occurrence of a handover failure).

TABLE 1

| Fields | Optionality | Field description | Availability in radio link failure | Availability in HOF | Same value on successive failures |
|---|---|---|---|---|---|
| measResultLastServCell-r16 | Mandatory | Serving cell meas | Available (1) | Available (2) | No |
| measResultNeighCells-r16 | optional | Neighboring cell meas | Available (1) | Available (2) | No |
| c-RNTI-r16 | Mandatory | indicates the C-RNTI used in the PCell upon detecting radio link failure or the C-RNTI used in the source PCell upon handover failure | Available (1) | Available | Yes |
| previousPCellId-r16 | optional | indicate the source PCell of the last handover | N/A | Available (2) | N/A |
| failedPCellId-r16 | Mandatory | indicate the PCell in which RLF is detected or the target PCell of the failed handover | Available (1) | Available (2) | No |
| reconnectCellId-r16 | optional | indicate the cell in which the UE comes back to connected after connection failure and after failing to perform reestablishment | N/A (if DAPS is ongoing, the radio link failure in the source isn't followed by reestablishment) | Available (2) | N/A |
| timeUntilReconnection-16 | optional | indicate the time that elapsed between the connection (radio link or handover) failure and the next time the UE comes to RRC CONNECTED in an NR or EUTRA cell | Available (1) | Available (2) | No |
| reestablishmentCellId-r16 | optional | indicate the cell in which the re-establishment attempt was made after connection failure | N/A | Available (2) | N/A |
| timeConnFailure-r16 | optional | indicate the time elapsed since the last HO initialization until connection failure | N/A | Available (2) | N/A |
| timeSinceFailure-r16 | Mandatory | indicate the time that elapsed since the connection (radio link or handover) failure | Available (1) | Available (2) | No |
| connectionFailureType-r16 | Mandatory | indicate whether the connection failure is due to radio link failure or handover failure | Available (1) | Available (2) | No |
| rlf-Cause-r16 | Mandatory | indicate the cause of the last radio link failure that was detected | Available (1) | N/A (ignored) | N/A |
| locationInfo-r16 | optional | UE location | Available (1) | Available (2) | No |
| noSuitableCellFound-r16 | optional | set by the UE when the T311 expires | N/A | Available (2) | N/A |
| ra-InformationCommon-r16 | optional | RA related info | Available (1) | Available (2) | No |

Figure 6:
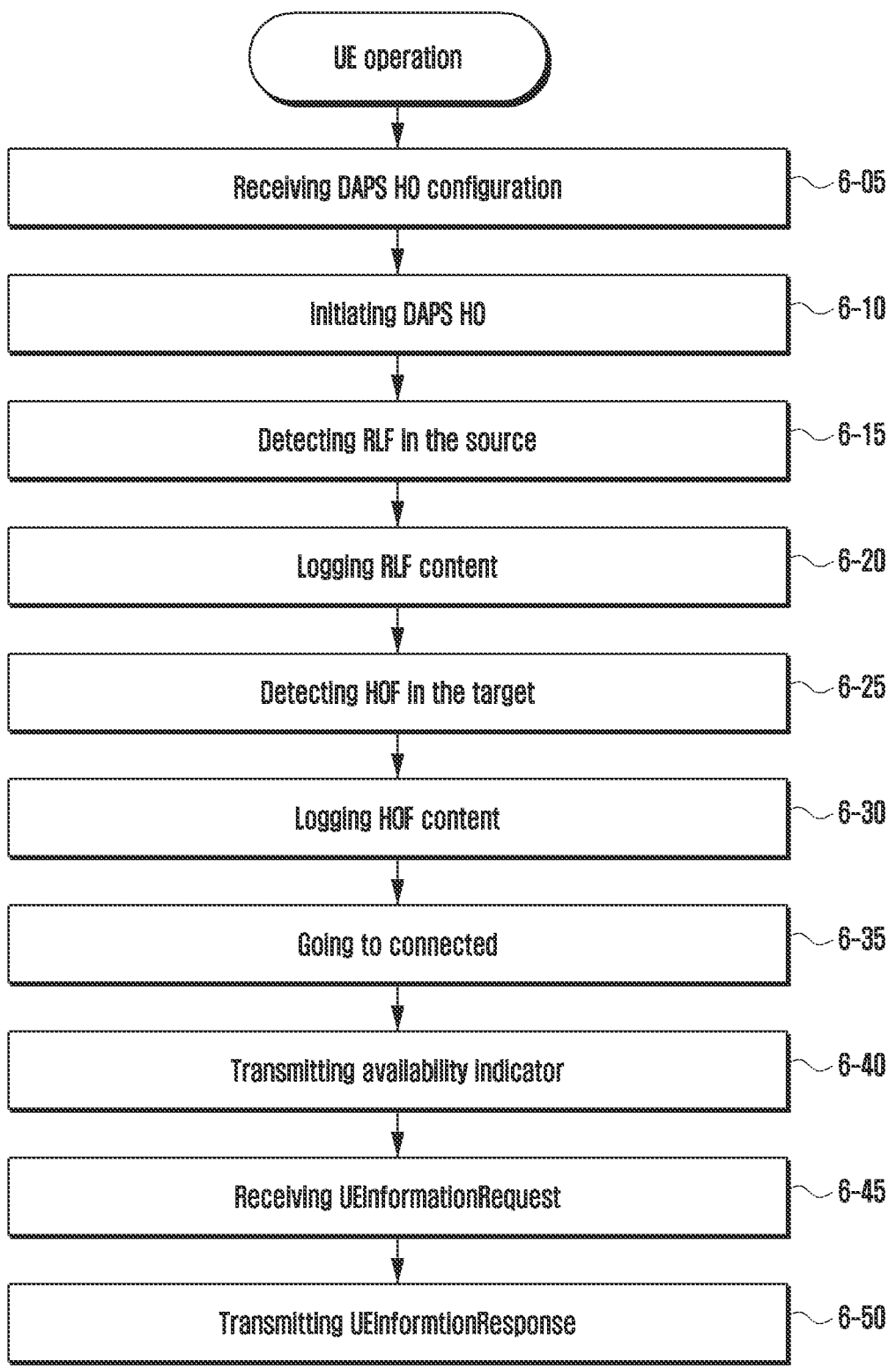
FIG. 6 is a diagram illustrating operations of the UE for recording and reporting a DAPS handover failure in a mobile communication system according to an embodiment of the disclosure.

FIG. 6 is a diagram illustrating operations of the UE for recording and reporting a DAPS handover failure in a mobile communication system according to an embodiment of the disclosure. At step 6-05, the UE may receive DAPS HO configuration information from the source cell.

At step 6-10, the UE may trigger DAPS HO by applying the received DAPS HO configuration information. The UE may maintain data transmission and reception to and from the source cell, and may determine whether an RLF occurs in the source cell through radio link monitoring (RLM) operation.

At step 6-15, the UE may detect an RLF occurring in the source cell during DAPS HO execution.

At step 6-20, the UE may store information about the RLF having occurred in the source cell. For example, the information about an RLF having occurred in the source cell may include information indicated by (1) in Table 1. Specifically, information on an RLF in the source cell may include an indicator indicating RLF occurrence, information about the time from when the UE receives DAPS HO configuration information from the source cell until the RLF has occurred in the source cell, information about the time between RLF occurrence in the source cell and handover failure to the target cell, and/or an indicator indicating the time order of RLF occurrence in the source cell and handover failure to the target cell.

At step 6-25, the UE may recognize that the DAPS HO has failed.

At step 6-30, the UE may store information about the DAPS HO failure.

At step 6-35, the UE may be switched to a connected mode with respect to a specific base station.

At step 6-40, the UE may report, to the base station, an availability indicator indicating that information on the two successive failures is stored.

At step 6-45, the UE may receive a request message for reporting an RLF report including the above information from the base station. For example, the request message may be delivered through UEInformationRequest.

At step 6-50, the UE may report the RLF report to the base station by including it in a UEInformationResponse message.

In the example of FIG. 6, it is described that an RLF in the source cell is detected first and then a HO failure to the target cell is detected, but this is only an example for convenience of description and does not limit the technical scope of the disclosure. Therefore, the method proposed in the disclosure can be applied even when detecting a HO failure to the target cell first and then detecting an RLF in the source cell.

Figure 7:
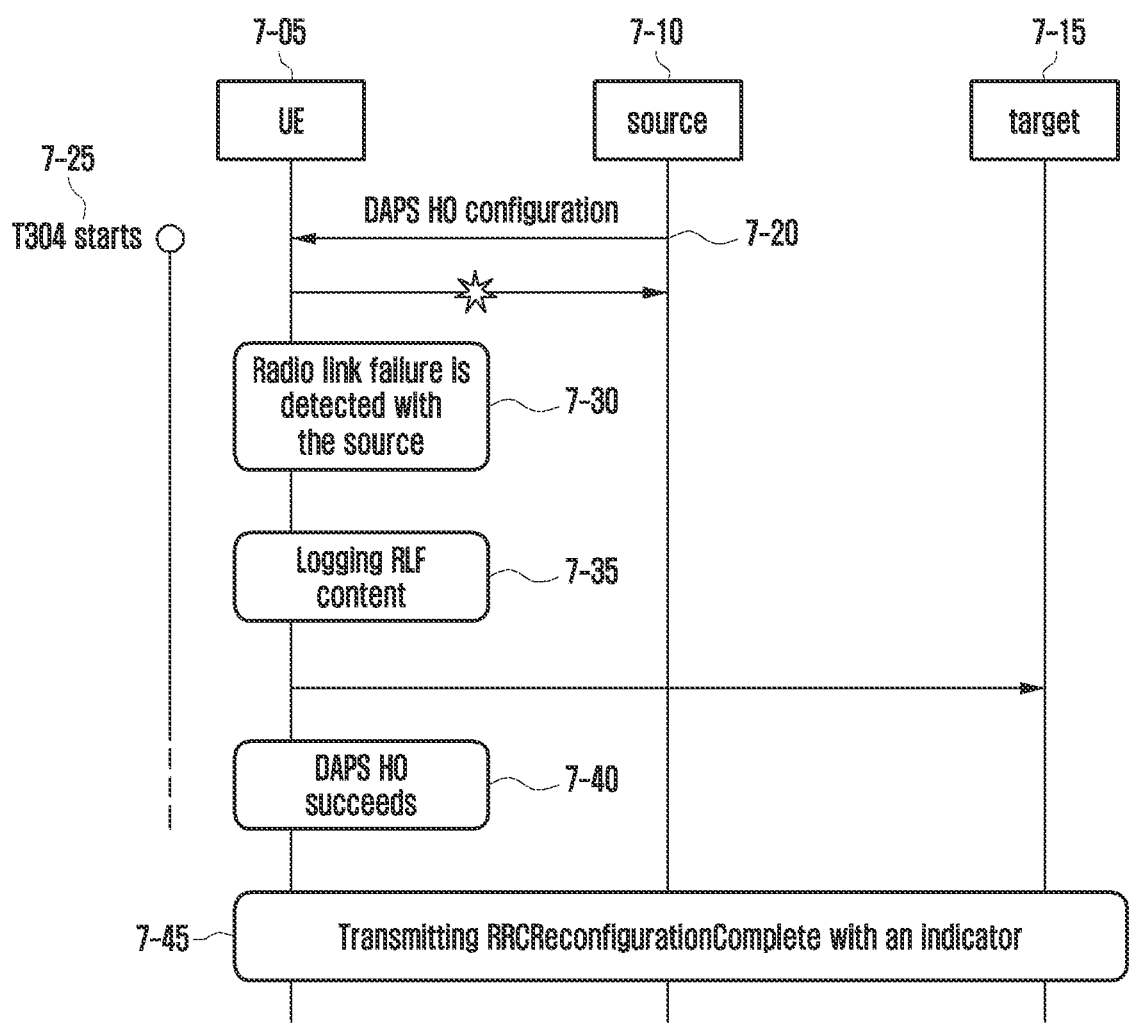
FIG. 7 is a diagram showing a sequence of operations of UE, source gNB, and target gNB for recording and reporting an RLF occurring in the source cell during DAPS handover in a mobile communication system according to an embodiment of the disclosure.

FIG. 7 is a diagram showing a sequence of operations of UE, source gNB, and target gNB for recording and reporting an RLF occurring in the source cell during DAPS handover in a mobile communication system according to an embodiment of the disclosure.

The disclosure proposes a method for storing and reporting the information on an RLF in case that, after a DAPS HO is configured, the RLF occurs in the source cell before the DAPS HO is completed (before information indicating release of the source cell is received from the target cell) and handover to the target cell is successful.

The UE 7-05 may receive DAPS HO configuration information from the source cell 7-10 (7-20). Upon receiving the configuration information, the UE may start the T304 timer (7-25) and perform DAPS HO. For example, the procedure for the UE to perform DAPS HO may be based on the above description with reference to FIG. 4. During the DAPS HO process, the UE may maintain data transmission and reception to and from the source cell, and may continuously perform radio link monitoring (RLM) operation on the source cell. If an RLF occurs in the source cell during the DAPS HO process (7-30), the UE may store specific information (7-35). In the related art procedure, no information on the RLF is stored in this scenario. The purpose of DAPS HO is to minimize the interruption time of data transmission and reception by simultaneously connecting the UE to the source cell and the target cell 7-15 during handover. If an RLF occurs in the source cell, the network needs to be aware that such a problem has occurred because the purpose cannot be achieved even if DAPS HO is configured.

The words "during the DAPS HO process" may mean a time interval from the time when the UE receives DAPS HO configuration information to the time when the target cell instructs the UE to release the connection to the source cell by using a specific RRC message. Alternatively, they may mean a time interval from the time when the UE receives DAPS HO configuration information to the time when the UE successfully transmits an RRCReconfigurationComplete message to the target cell.

When an RLF occurs in the source cell during the DAPS HO process, the UE may store information related thereto. At this time, an indicator indicating that the RLF has occurred may be included in the RLF report, or a portion of information included in the RLF report may be stored. In Table 1 above, among information that can be included in the RLF report, information that can be included when an RLF occurs in the source cell during the DAPS HO process is indicated by (1).

When an RLF has occurred in the source cell and handover to the target cell is successfully completed, T304 may be stopped (7-40). When transmitting RRCReconfigurationComplete to the target cell, the UE may include, in it, an indicator indicating that an RLF has occurred in the source cell during the DAPS HO process (7-45). This indicator may be included in an RRCReconfigurationComplete message transmitted to the target cell for the first time during the handover process, or in an RRCReconfigurationComplete message transmitted as a response message after receiving an RRCReconfiguration message having a daps-SourceRelease field from the target cell. Alternatively, an RLF report or successful HO report may be reported by including RLF-related information in the source cell (e.g., information indicated by (1) in Table 1) or the above indicator.

Figure 8:
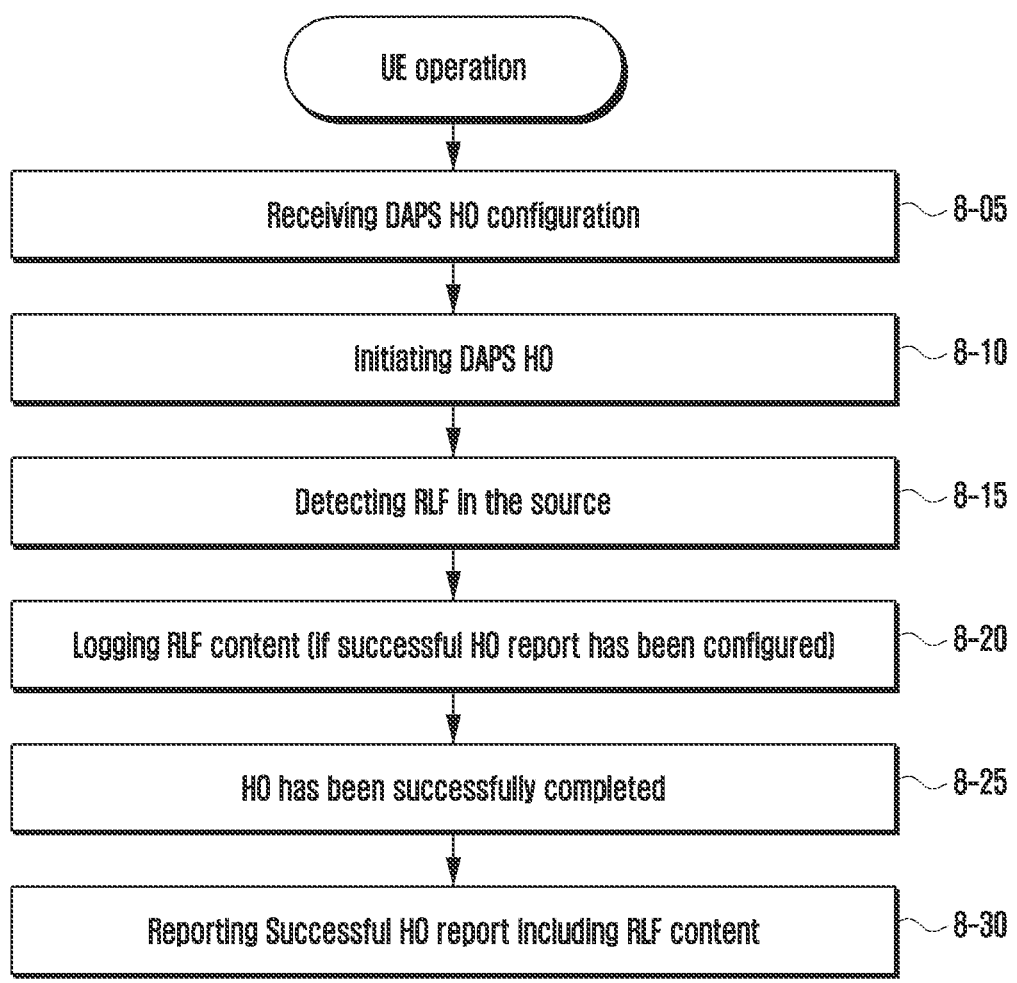
FIG. 8 is a diagram showing operations of the UE for recording and reporting an RLF occurring in the source cell during DAPS handover according to an embodiment of the disclosure.

FIG. 8 is a diagram showing operations of the UE for recording and reporting an RLF occurring in the source cell during DAPS handover according to an embodiment of the disclosure.

At step 8-05, the UE may receive DAPS HO configuration information from the source cell. In addition, an operation of reporting related information when the handover is successfully completed, that is, a successful HO reporting operation may be configured.

At step 8-10, the UE may trigger DAPS HO by applying the received configuration information. The UE may maintain data transmission and reception to and from the source cell and may determine whether an RLF occurs in the source cell through RLM operation.

At step 8-15, the UE may detect an RLF occurring in the source cell during DAPS HO.

At step 8-20, the UE may store information about the RLF having occurred in the source cell.

At step 8-25, the UE may successfully complete the DAPS HO. Successfully completing the DAPS HO may mean that the UE has successfully transmitted an RRCReconfigurationComplete message to the target cell or the UE has received an RRCReconfiguration message including configuration information, that is, the dapsSourceRelease-r16 field for releasing the connection to the source cell from the target cell.

At step 8-30, the UE may report, to the target cell, the RLF related information in the source cell together with information related to the successfully completed handover by using configured successful HO reporting. As another option, RLF-related information in the source cell may be reported to the base station through an RLF report. When reporting information about an RLF having occurred in the source cell through a successful HO report or RLF report, the terminal may report in advance to the base station that such information is stored by using a specific RRC message, e.g., RRCReconfigurationComplete, and the UE may report the stored information to the base station according to a request of the base station.

Figure 9:
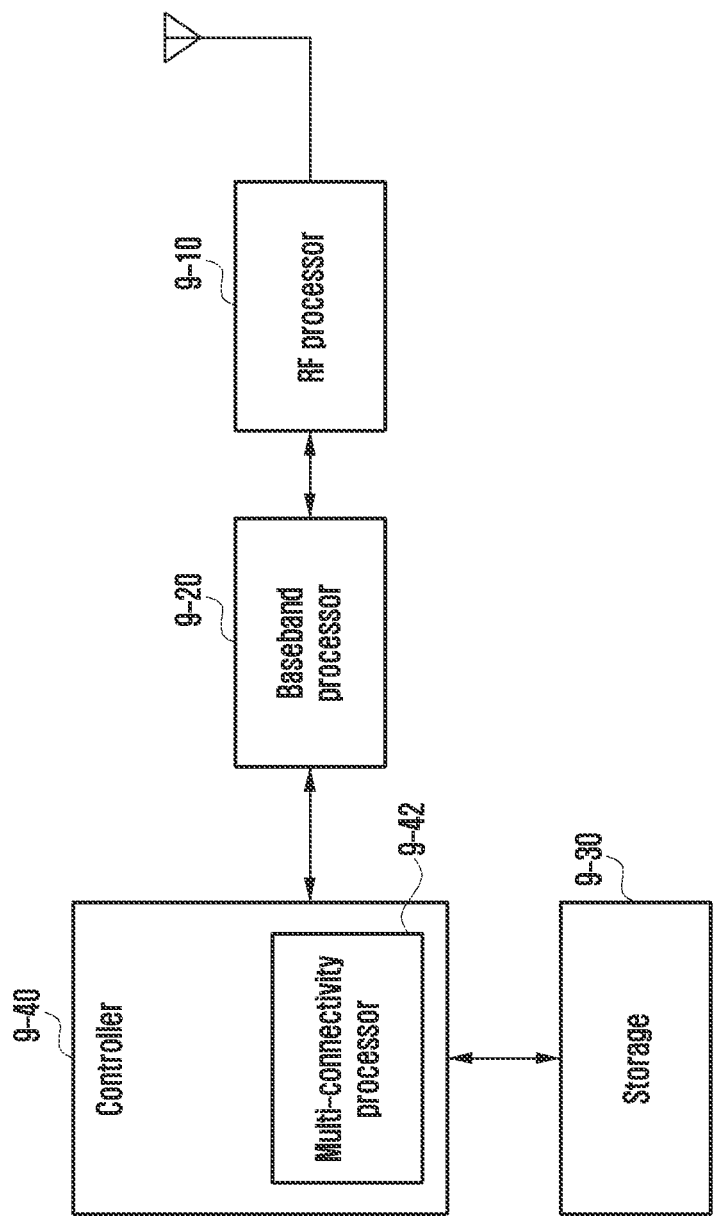
FIG. 9 is a block diagram illustrating the internal structure of a UE according to an embodiment of the disclosure.

FIG. 9 is a block diagram illustrating the internal structure of a UE according to an embodiment of the disclosure.

Referring to the drawing, the UE may include a radio frequency (RF) processor 9-10, a baseband processor 9-20, a storage 9-30, and a controller 9-40.

The RF processor 9-10 performs a function for transmitting and receiving a signal through a radio channel, such as signal band conversion and amplification. That is, the RF processor 9-10 performs up-conversion of a baseband signal provided from the baseband processor 9-20 into an RF-band signal and transmits it through an antenna, and performs down-conversion of an RF-band signal received through an antenna into a baseband signal. For example, the RF processor 9-10 may include a transmission filter, a reception filter, an amplifier, a mixer, an oscillator, a digital-to-analog converter (DAC), and an analog-to-digital converter (ADC). Although only one antenna is illustrated in the drawing, the UE may be provided with a plurality of antennas. Also, the RF processor 9-10 may include a plurality of RF chains. Further, the RF processor 9-10 may perform beamforming. For beamforming, the RF processor 9-10 may adjust phases and magnitudes of signals transmitted and received through plural antennas or antenna elements. Further, the RF processor may perform MIMO, and may receive several layers during a MIMO operation.

The baseband processor 9-20 performs conversion between a baseband signal and a bit stream in accordance with the physical layer specification of the system. For example, during data transmission, the baseband processor 9-20 generates complex symbols by encoding and modulating a transmission bit stream. Further, during data reception, the baseband processor 9-20 restores a reception bit stream by demodulating and decoding a baseband signal provided from the RF processor 9-10. For example, in the case of utilizing orthogonal frequency division multiplexing (OFDM), for data transmission, the baseband processor 9-20 generates complex symbols by encoding and modulating a transmission bit stream, maps the complex symbols to subcarriers, and composes OFDM symbols through inverse fast Fourier transform (IFFT) operation and cyclic prefix (CP) insertion. Further, for data reception, the baseband processor 9-20 divides a baseband signal provided from the RF processor 9-10 in units of OFDM symbols, restores signals mapped to subcarriers through fast Fourier transform (FFT) operation, and reconstructs the reception bit stream through demodulation and decoding.

The baseband processor 9-20 and the RF processor 9-10 transmit and receive signals as described above. Hence, the baseband processor 9-20 and the RF processor 9-10 may be called a transmitter, a receiver, a transceiver, or a communication unit. Further, to support different radio access technologies, at least one of the baseband processor 9-20 or the RF processor 9-10 may include a plurality of communication modules. In addition, to process signals of different frequency bands, at least one of the baseband processor 9-20 or the RF processor 9-10 may include different communication modules. For example, the different radio access technologies may include a wireless LAN (e.g., IEEE 802.11), a cellular network (e.g., LTE), and the like. In addition, the different frequency bands may include a super high frequency (SHF) band (e.g., 2.NRHz, NRhz) and a millimeter wave (mmWave) band (e.g., 60 GHz).

The storage 9-30 stores data such as basic programs, application programs, and configuration information for the operation of the UE. In particular, the storage 9-30 may store information about a second access node that performs wireless communication using a second radio access technology. Also, the storage 9-30 provides stored data in response to a request from the controller 9-40.

The controller 9-40 controls the overall operation of the UE. For example, the controller 9-40 transmits and receives signals through the baseband processor 9-20 and the RF processor 9-10. Further, the controller 9-40 writes or reads data to or from the storage 9-40. To this end, the controller 9-40 may include at least one processor. For example, the controller 9-40 may include a communication processor (CP) for controlling communication and an application processor (AP) for controlling higher layers such as application programs.

Figure 10:
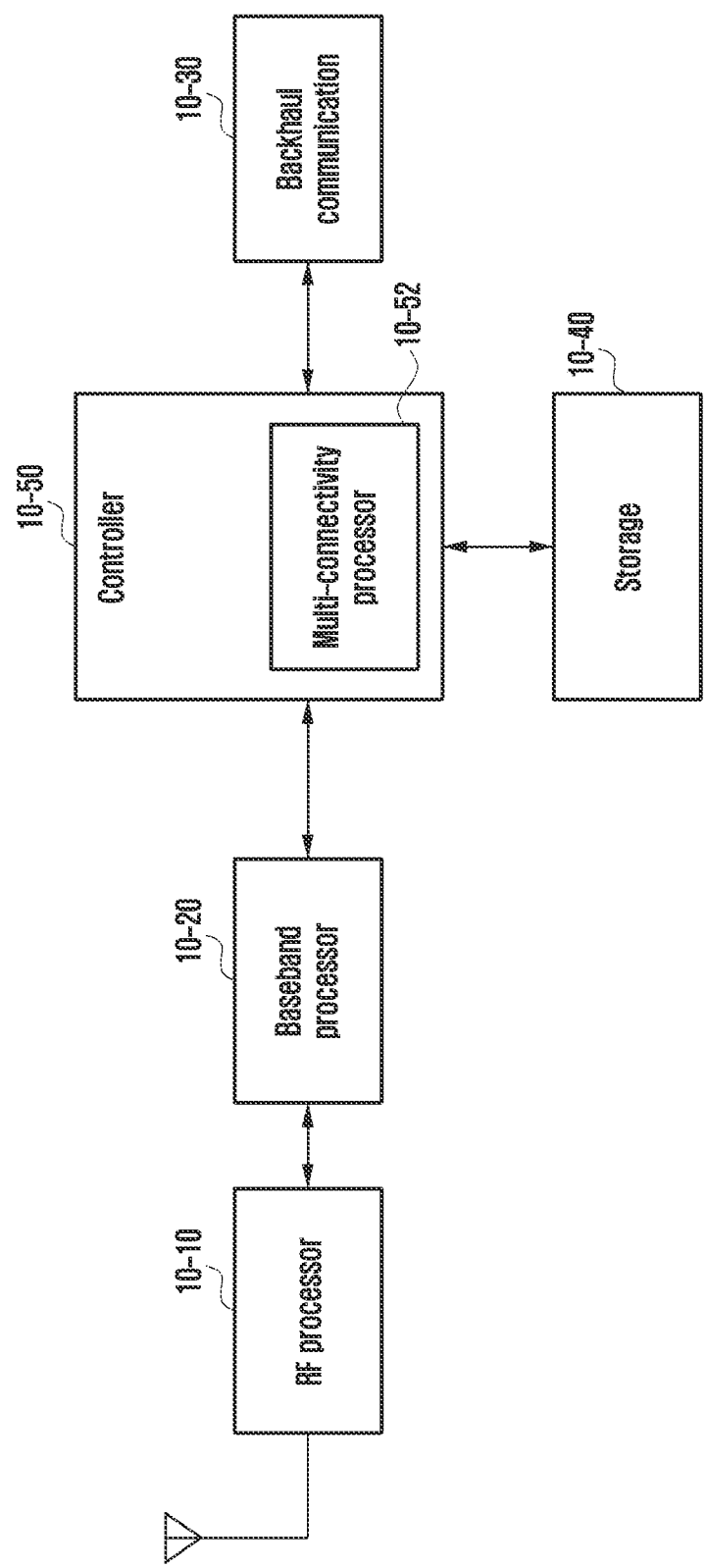
FIG. 10 is a block diagram illustrating the structure of a base station according to an embodiment of the disclosure.

FIG. 10 is a block diagram illustrating the structure of a base station according to an embodiment of the disclosure. As shown in the drawing, the base station includes an RF processor 10-10, a baseband processor 10-20, a backhaul communication unit 10-30, a storage 10-40, and a controller 10-50.

The RF processor 10-10 performs a function for transmitting and receiving a signal through a radio channel, such as signal band conversion and amplification. That is, the RF processor 10-10 performs up-conversion of a baseband signal provided from the baseband processor 10-20 into an RF-band signal and transmits the converted signal through an antenna, and performs down-conversion of an RF-band signal received through an antenna into a baseband signal. For example, the RF processor 10-10 may include a transmission filter, a reception filter, an amplifier, a mixer, an oscillator, a DAC, and an ADC. Although only one antenna is illustrated in the drawing, the first access node may be provided with a plurality of antennas. Additionally, the RF processor 10-10 may include a plurality of RF chains. Further, the RF processor 10-10 may perform beamforming. For beamforming, the RF processor 10-10 may adjust phases and amplitudes of signals transmitted and received through plural antennas or antenna elements. The RF processor may perform downlink MIMO operation by transmitting one or more layers.

The baseband processor 10-20 performs conversion between a baseband signal and a bit stream in accordance with the physical layer specification of a first radio access technology. For example, for data transmission, the baseband processor 10-20 generates complex symbols by encoding and modulating a transmission bit stream. Further, for data reception, the baseband processor 10-20 restores a reception bit stream by demodulating and decoding a baseband signal provided from the RF processor 10-10. For example, in the case of utilizing OFDM, for data transmission, the baseband processor 10-20 generates complex symbols by encoding and modulating a transmission bit stream, maps the complex symbols to subcarriers, and composes OFDM symbols through IFFT operation and CP insertion. Further, for data reception, the baseband processor 10-20 divides a baseband signal provided from the RF processor 10-10 in units of OFDM symbols, restores the signals mapped to subcarriers through FFT operation, and reconstructs the reception bit stream through demodulation and decoding. The baseband processor 10-20 and the RF processor 10-10 transmit and receive signals as described above. Hence, the baseband processor 10-20 and the RF processor 10-10 may be called a transmitter, a receiver, a transceiver, a communication unit, or a wireless communication unit.

The backhaul communication unit 10-30 provides an interface for communication with other nodes in the network. That is, the backhaul communication unit 10-30 converts a bit stream, which is to be transmitted from the primary base station to another node, for example, a secondary base station or the core network, into a physical signal, and converts a physical signal received from another node into a bit stream.

The storage 10-40 stores data such as basic programs, application programs, and configuration information for the operation of the primary base station. In particular, the storage 10-40 may store information on a bearer allocated to a connected UE and measurement results reported from the connected UE. Further, the storage 10-40 may store information used as a criterion for determining whether to provide or suspend multi-connectivity to the UE. In addition, the storage 10-40 provides stored data in response to a request from the controller 10-50.

The controller 10-50 controls the overall operation of the primary base station. For example, the controller 10-50 transmits and receives signals through the baseband processor 10-20 and the RF processor 10-10 or through the backhaul communication unit 10-30. Further, the controller 10-50 writes or reads data to or from the storage 10-40. To this end, the controller 10-50 may include at least one processor.

Figure 11:
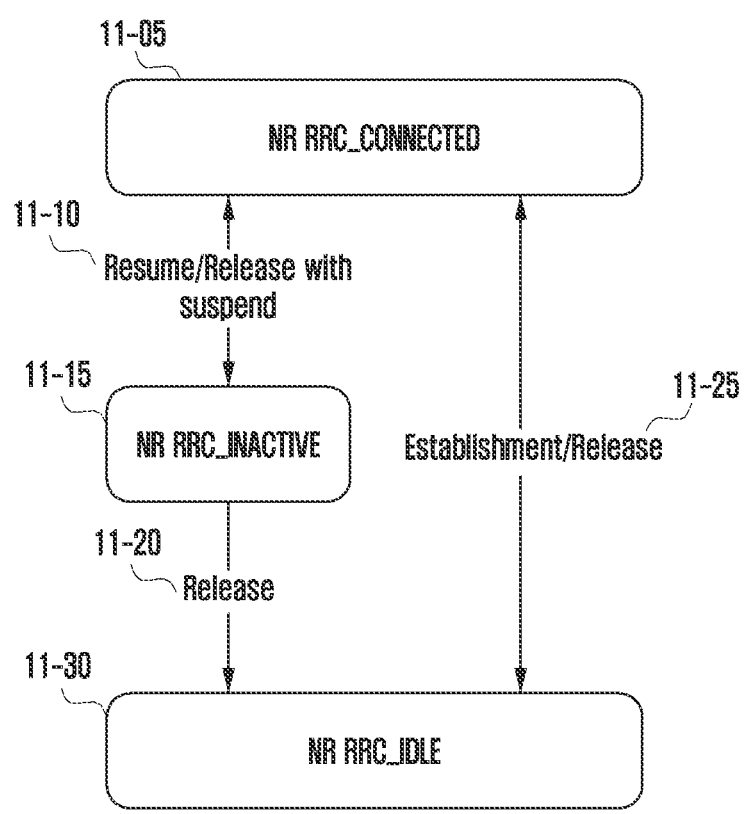
FIG. 11 is a diagram for depicting radio connection state transitions in a next-generation mobile communication system according to an embodiment of the disclosure.

FIG. 11 is a diagram for depicting radio connection state transitions in a next-generation mobile communication system according to an embodiment of the disclosure.

The next-generation mobile communication system has three radio connection states (RRC states). The connected mode (RRC_CONNECTED, 11-05) is a radio connection state in which the UE can transmit and receive data. The idle mode (RRC_IDLE, 11-30) is a radio connection state in which the UE monitors whether paging is transmitted to it. These two modes are a radio connection state that is also applied to the existing LTE system, and the detailed description thereof is the same as that of the existing LTE system. In the next-generation mobile communication system, the inactive mode (RRC_INACTIVE, 11-15) is newly defined as a radio connection state. In this radio connection state, UE contexts are maintained in the base station and the UE and RAN-based paging is supported. The characteristics of the new radio connection state are listed below.

Cell re-selection mobility;
CN-NR RAN connection (both C/U-planes) has been established for UE;
The UE AS context is stored in at least one gNB and the UE;
Paging is initiated by NR RAN;
RAN-based notification area is managed by NR RAN;
NR RAN knows the RAN-based notification area which the UE belongs to;

The new "inactive" radio connection state may transition to connected mode or idle mode by using a specific procedure. Inactive mode may transition to connected mode according to a resume process, and connected mode may transition to inactive mode by using a release procedure including suspend configuration information (11-10). The above procedure may transmit and receive one or more RRC messages between the UE and the base station, and may be composed of one or more steps. Also, after resume, inactive mode can transition to idle mode by using a release procedure (11-20). Transitions between connected mode and idle mode may follow the existing LTE technology. That is, through an establishment procedure or release procedure, the transition between these modes may be made (11-25).

Figure 12:
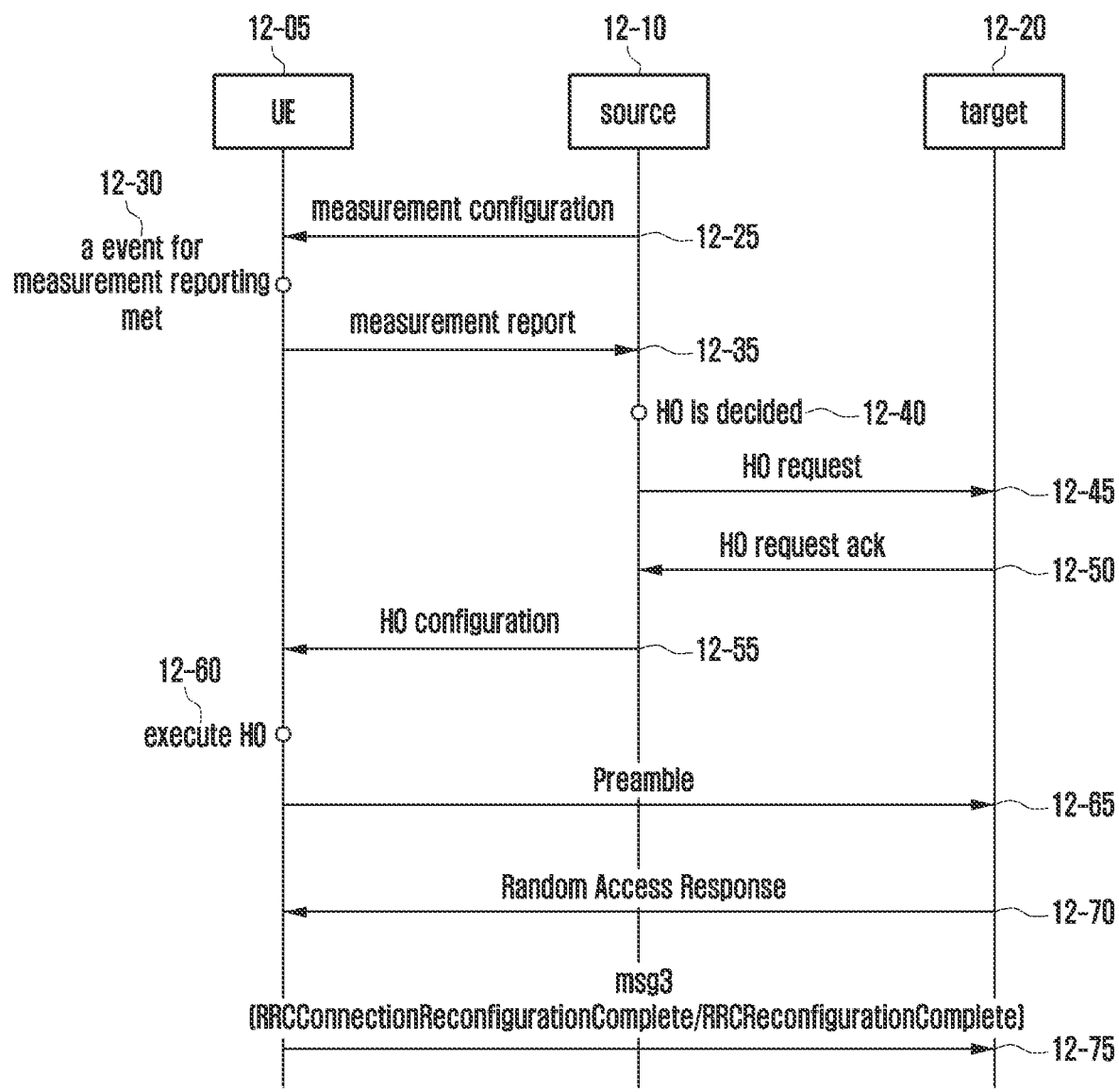
FIG. 12 is a diagram illustrating a sequence of operations of UE, source cell, and target cell for executing a first handover operation in a mobile communication system according to an embodiment of the disclosure.

FIG. 12 is a diagram illustrating a sequence of operations of UE, source cell, and target cell for executing a first handover operation in a mobile communication system according to an embodiment of the disclosure. In the disclosure, the first handover may refer to a regular handover.

The UE 12-05 may receive a specific RRC message including measurement configuration information from the source cell 12-10 (12-25). The UE may measure the signal quality of the serving cell and neighbor cells by applying the measurement configuration information, and it may, on a periodic basis or occurrence of a set event (12-30), report the collected cell measurement information to the source cell (12-35). The source cell may determine whether to trigger the first handover operation based on the reported cell measurement information (12-40). For example, when cell measurement information is reported due to occurrence of event A3 (neighbor becomes offset better than SpCell), the source cell may determine to trigger the first handover. Upon determining to trigger the first handover, the source cell may make a first handover request to one target cell 12-20 by using a specific inter-node message (12-45). Upon receiving the request, the target cell may accept it and transmit handover configuration information necessary for the first handover operation to the source cell (12-50). The source cell may include the handover configuration information received from the target cell and additional configuration information in a specific RRC message and transmit the RRC message to the UE (12-55). For example, the configuration information may include target cell ID, frequency information, configuration information necessary for random access operation to the target cell (dedicated preamble information, dedicated radio resource information, etc.), transmission power information, and C-RNTI information used in the target cell.

Upon receiving the handover configuration information, the UE may immediately initiate a random access process to the target cell and start the T304 timer (12-60). The UE may transmit a preamble to the target cell based on the provided configuration information necessary for random access operation (12-65). If a dedicated preamble is not provided, one of the preambles used on a contention basis may be transmitted. Upon receiving the preamble, the target cell may transmit a random access response (RAR) message to the UE (12-70). The UE may transmit msg3 to the target cell by using UL grant information included in the RAR (12-75). Msg3 may include an RRCConnectionReconfigurationComplete message in the case of the LTE system, and may include an RRCReconfigurationComplete message in the case of the NR system. If the random access process is successfully completed, it may be considered that the first handover is successfully completed, and the running T304 timer may be stopped. If the first handover is not successfully completed until the T304 timer expires, it may be regarded as a handover failure.

Figure 13:
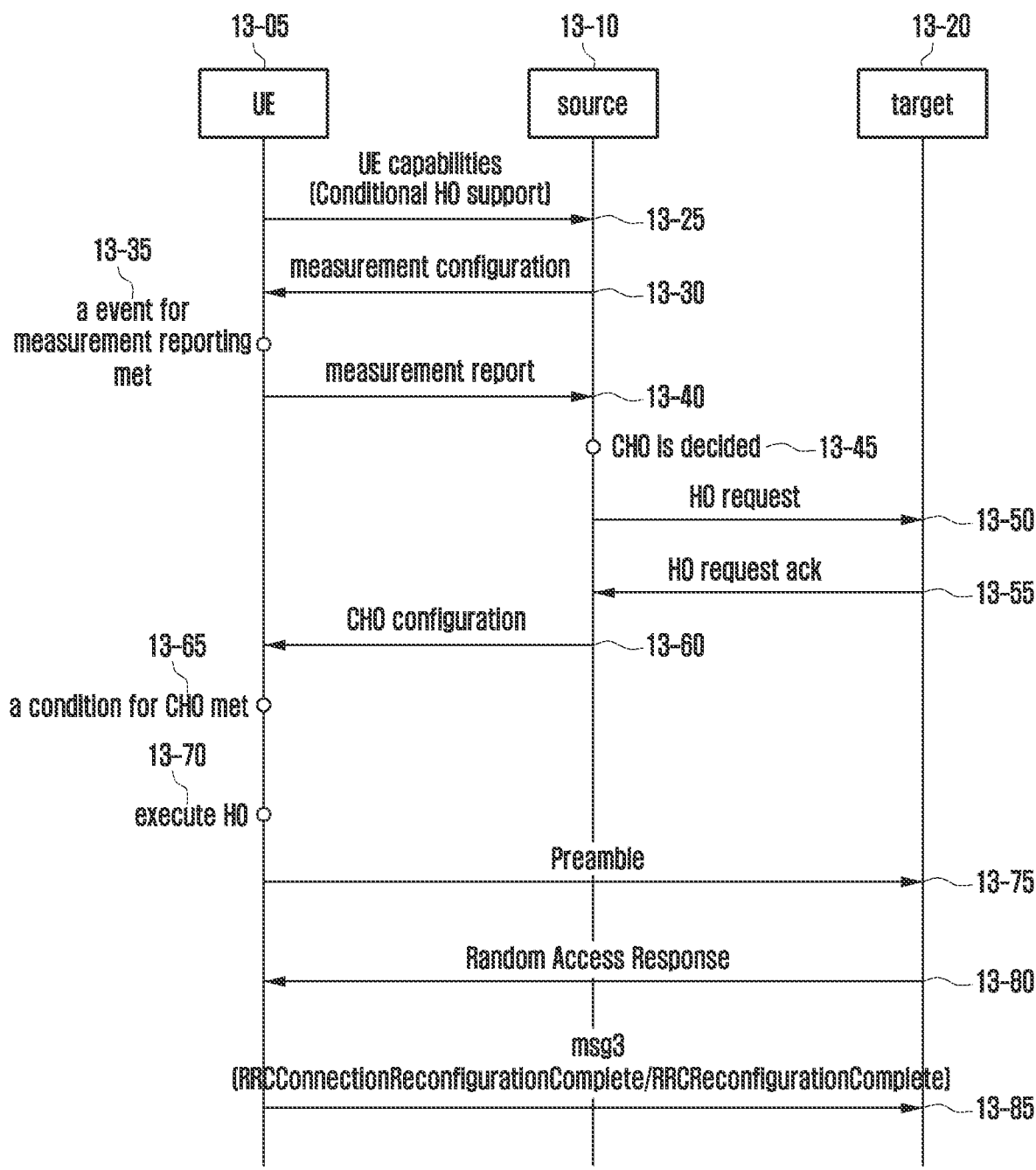
FIG. 13 is a diagram illustrating a sequence of operations of UE, source cell, and target cell for executing a second handover operation (condition-based handover) in a mobile communication system according to an embodiment of the disclosure.

FIG. 13 is a diagram illustrating a sequence of operations of UE, source cell, and target cell for executing a second handover operation (condition-based handover) in a mobile communication system according to an embodiment of the disclosure.

The UE 13-05 may report its capability information to the source cell 13-10 (13-25). This capability information may include information indicating whether the UE supports a second handover (e.g., conditional handover). The UE may receive a specific RRC message including measurement configuration information from the source cell (13-30). The UE may measure the signal quality of the serving cell and neighbor cells by applying the measurement configuration information, and it may, on a periodic basis or occurrence of a set event (13-35), report the collected cell measurement information to the source cell (13-40). The source cell may determine whether to trigger a second handover operation based on the reported cell measurement information (13-45). To configure a second handover, the UE must be able to support the second handover. Upon determining to trigger the second handover, the source cell may make a second handover request to one or more target cells 13-20 by using a specific inter-node message (13-50). Upon receiving the request, the target cells may accept it and transmit handover configuration information necessary for the second handover operation to the source cell (13-55). Those target cells that do not accept the request are excluded from the second handover. The source cell may include the handover configuration information received from the target cells and additional configuration information in a specific RRC message and transmit the RRC message to the UE (13-60). For example, the configuration information may include target cell IDs, frequency information, configuration information necessary for random access operation to the target cells (e.g., dedicated preamble information and dedicated radio resource information per target cell), transmission power information, C-RNTI information used in each target cell, and conditions for triggering random access operation to each target cell. The conditions may be different for individual target cells, and plural conditions may be set for one target cell.

Upon receiving the handover configuration information, the UE may evaluate whether the provided condition(s) are satisfied (13-65). If a condition associated with a specific target cell is satisfied, the UE may initiate a random access process to the target cell and start the T304 timer (13-70). For example, in case that event A3 (Neighbour becomes offset better than SpCell) is set as the above condition, if this condition is satisfied, the UE may transmit a preamble to the associated target cell based on the provided configuration information (13-75). If a dedicated preamble is not provided, one of the preambles used on a contention basis may be transmitted. Upon receiving the preamble, the target cell may transmit a random access response (RAR) message to the UE (13-80). The UE may transmit msg3 to the target cell by using UL grant information included in the RAR (13-85). Msg3 may include an RRCConnectionReconfiguration-Complete message in the case of the LTE system, and may include an RRCReconfigurationComplete message in the case of the NR system. If the random access process is successfully completed, it may be considered that the second handover is successfully completed, and the running T304 timer may be stopped. If the second handover is not successfully completed until the T304 timer expires, it may be regarded as a handover failure.

When the handover is successfully completed, the UE may delete the handover configuration information. When receiving a handover success report from the target cell, the source cell may delete the context information of the UE. The handover success or failure may also be determined by a UE context release message, which is an inter-node message transmitted from the target cell to the source cell. In addition, the source cell may instruct other candidate target cells included in the handover configuration information to delete the handover configuration information (or UE context information) (or, the source cell may notify that it is no longer valid). Alternatively, the candidate target cells may delete the handover configuration information by themselves when a specified time elapses after receiving the handover request, without an instruction from the source cell.

Figure 14:
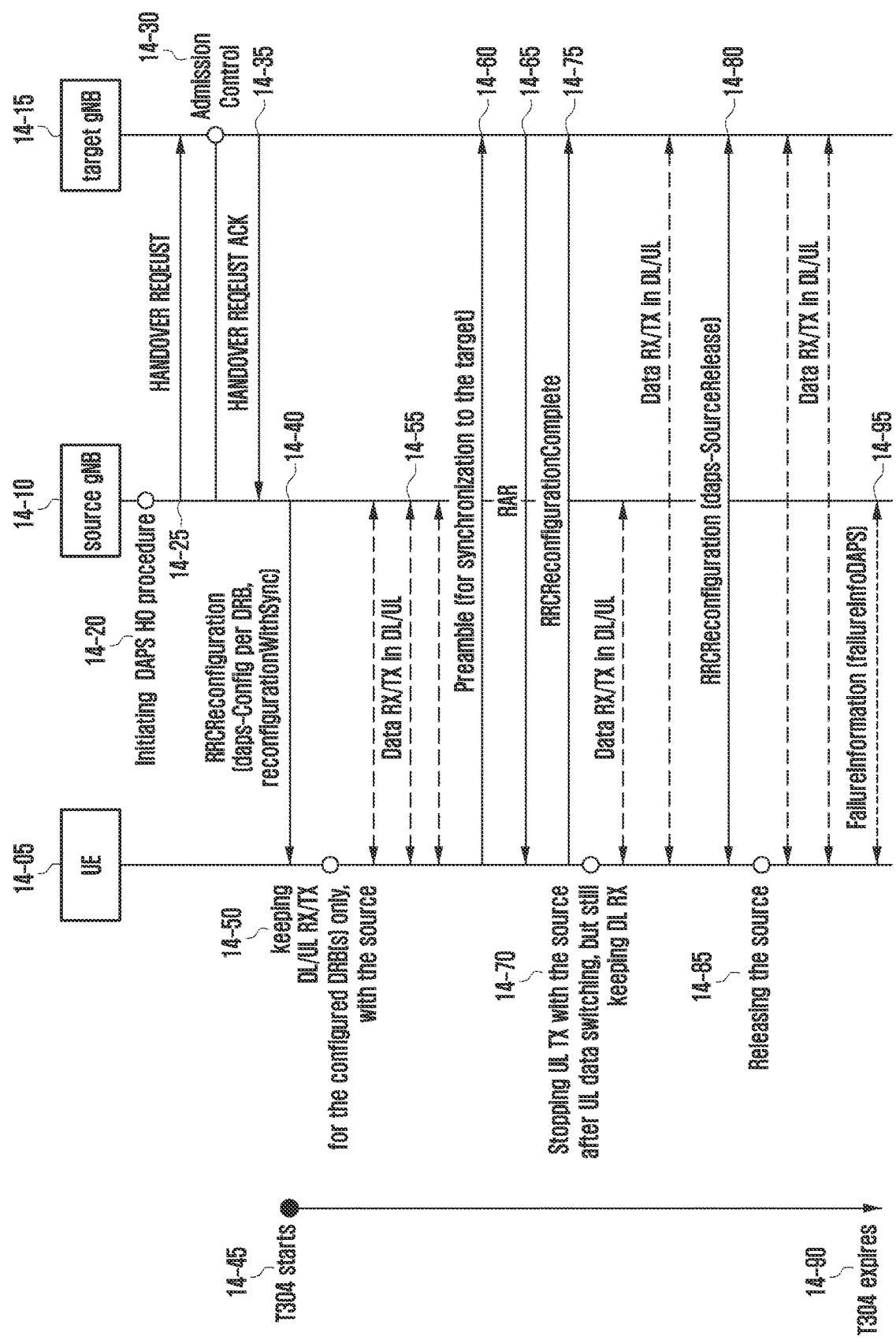
FIG. 14 is a diagram illustrating a sequence of operations of UE, source cell, and target cell for executing a third handover operation (DAPS handover) in a mobile communication system according to an embodiment of the disclosure.

FIG. 14 is a diagram illustrating a sequence of operations of UE, source cell, and target cell for executing a third handover operation (e.g., DAPS handover) in a mobile communication system according to an embodiment of the disclosure.

Dual active protocol stack (DAPS) handover technology is a technique that maintains data transmission and reception to and from the source gNB during a handover process in order to minimize service interruption. Since the UE simultaneously processes data transmission and reception with the source gNB and the target gNB, it must support two protocol stacks. DAPS is set on a per-DRB basis, and if DAPS is configured in at least one DRB, DAPS is also applied to the SRB. In the disclosure, the DAPS handover is referred to as a third handover.

When the source cell 14-10 determines to trigger a DAPS handover (14-20), the source cell may make a regular handover request to one target cell 14-15 through a specific inter-node message (14-25). Upon receiving the request, the target cell may accept it through specific admission control (14-30) and may transmit handover configuration information necessary for the regular handover operation to the source cell (14-35). The source cell may include the handover configuration information received from the target cell in a specific RRC message and transmit the RRC message to the UE 14-05 (14-40). For example, the configuration information may include target cell ID, frequency information, configuration information necessary for random access operation to the target cell (e.g., dedicated preamble information, dedicated radio resource information), transmission power information, and C-RNTI information used in the target cell. In addition, DAPS-related configuration information may also be included for each DRB.

Upon receiving the handover configuration information, the UE may immediately perform a random access process to the target cell and start the T304 timer (14-45). In addition, the UE may maintain data transmission and reception to and from the source cell only for the SRB and DRB to which DAPS is set (14-50, 14-55). The UE may transmit a preamble based on the provided configuration information (14-60). Upon receiving the preamble, the target cell may transmit a random access response (RAR) message to the UE (14-65). The UE may transmit msg3 to the target cell by using UL grant information included in the RAR (14-75). Msg3 may contain an RRCReconfigurationComplete message. When receiving downlink feedback for the RRCReconfigurationComplete message, it is considered that the DAPS handover is successfully completed, and the running T304 timer may be stopped. At this time, the UE RRC makes an uplink switching request to the UE PDCP, and uplink data is not transmitted to the source gNB from this time (14-70). However, uplink control information transmitted by lower layers of the PDCP can still be transmitted to the source gNB. In addition, the UE may perform data transmission and reception to and from the target cell. The target gNB may include a daps-SourceRelease field in RRCReconfiguration and transmit it to the UE (14-80); upon receiving the message, the UE may stop data transmission and reception to and from the source gNB (14-85). If the DAPS handover is not successfully completed until the T304 timer expires (14-90), the UE may determine whether an RLF has occurred in the source gNB. If an RLF has not occurred in the source gNB, the UE may continue data transmission and reception in the source gNB without declaring an RLF. Instead, it may be indicated that the configured DAPS handover to the target gNB has failed through a FailureInformation message (14-95). If an RLF has occurred in the source gNB, the UE may declare an RLF and regard the handover as a failure. At this time, the UE may perform a re-establishment operation after declaring the RLF. When declaring the RLF, the UE may record useful information that can be collected at that time, and can report an RLF report when connected to one cell later.

Next, the disclosure proposes a method in which the UE collects information about a successfully completed handover and reports it to the base station. In the disclosure, this is referred to as a successful HO report. Even though the UE has successfully completed the handover, the network needs to be aware of various failures that have occurred during the handover process. When the UE reports information related to a failure to the network, the network can optimize the handover operation based on the information. The successful HO report is a technique for reporting information related to a successfully completed handover to the base station. Successful HO reporting may be performed according to the settings of the base station, and may be composed of a series of processes in which the UE stores and reports useful information during or after a successfully completed handover process.

It may be inefficient for the UE supporting a successful HO report to always perform the reporting operation. The base station may configure a successful HO report to the UE only when it is necessary to confirm that there is a problem, or it may also provide specific conditions at the time of configuring a successful HO report, so that successful HO reporting may be executed when at least one of the conditions is satisfied. In addition, information to be collected in correspondence to a specific condition may also be set.

The UE may report the successful HO report to the base station at a specific time point after handover is successfully completed. In addition, if a specific condition is satisfied, configuration information of the successful HO report and stored content of the successful HO report may be deleted. Configuration information of a successful HO report may be applied to one or more handover executions.

Figure 15:
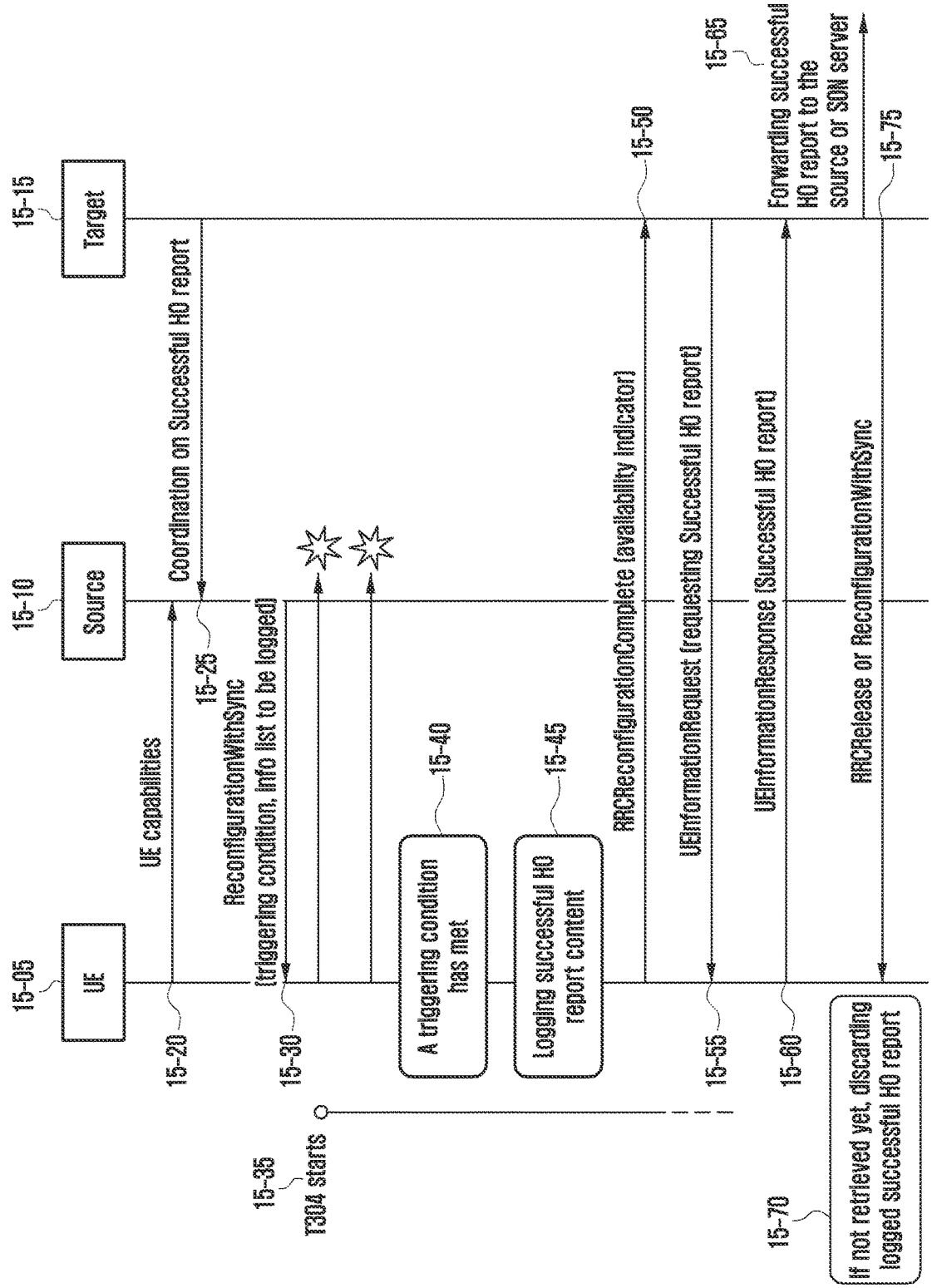
FIG. 15 is a diagram illustrating a sequence of operations of UE, source cell, and target cell for reporting a successfully completed handover in a mobile communication system according to an embodiment of the disclosure.

FIG. 15 is a diagram illustrating a sequence of operations of UE, source cell, and target cell for reporting a successfully completed handover in a mobile communication system according to an embodiment of the disclosure.

The UE 15-05 may report its capability information to the source cell 15-10 (15-20). This capability information may include an indicator indicating whether the UE supports a successful HO report. The source cell may make a handover request for the UE to the target cell 15-15. When the source cell and the target cell perform coordination for the handover, the source cell may indicate to the target cell that a successful HO report will be configured to the UE (15-25).

The source cell may configure a handover to the UE (15-30). When the source cell provides handover configuration information to the UE, the source cell may also configure a successful HO report. For example, the configuration information for a successful HO report may include condition(s) for storing the content of the successful HO report, and a list of useful information to be stored for each condition. Upon receiving the handover configuration information, the UE may start the T304 timer (15-35). The UE may attempt random access to the target cell and determine whether at least one of the specified conditions is satisfied. If at least one condition is satisfied (15-40), the UE may store specific information corresponding to the condition (15-45). Alternatively, specific information may be uniformly stored regardless of the satisfied condition.

The disclosure proposes conditions as shown in Table 2 below. Table 2 shows the conditions associated with a successful HO report and items of information that may be included in the successful HO report according to an embodiment of the disclosure. In the present disclosure, a handover completed after experiencing a number of difficulties is referred to as "bad HO", and a handover completed without difficulty is referred to as "good HO". The meaning of 'difficulty' may be determined by whether the following condition is satisfied.

For example, in the case of "bad HO", the signal quality of the source cell or the target cell may be poor, or there may be multiple preamble retransmissions or multiple contentions when performing random access to the target cell. Also, due to these effects, in the case of "bad HO", it takes a relatively long time from handover start to completion. In the case of DAPS HO, data transmission and reception to and from the source cell may be maintained even during the handover process. Hence, smooth connection to the source cell may also be a condition for successful handover.

TABLE 2

| Triggering Conditions | Description | Additionally logged information |
|---|---|---|
| Always if configured | When a successful HO report is configured and handover is successfully completed, specific information is always stored. | |
| | Triggering Conditions for bad HO | |
| if T310 started (or expired) in the source | After receiving handover configuration information from the source cell, if RRC in the source cell receives an out-of-sync indication from the physical layer N310 times, it is considered that a physical layer problem is detected and the T310 timer is started. | During handover process, information about the time from when the T310 timer starts until it stops |

TABLE 2-continued

| Triggering Conditions | Description | Additionally logged information |
|---|---|---|
| if T312 started (or expired) in the source | After receiving handover configuration information from the source cell, if the T310 timer is running in the source cell and a specific measurement report is triggered, the T312 timer is started. | During handover process, information about the time from when the T312 timer starts until it stops |
| if the quality (e.g. RSRP, RSRQ) of the source is worse than any (configurable) threshold | After receiving handover configuration information from the source cell, when the signal quality in the source cell is not better than a configured threshold | Lowest signal quality during handover process |
| if RLC retransmission in the source occurred more than any (configurable) threshold | After receiving handover configuration information from the source cell, when the number of RLC retransmissions in the source cell exceeds a configured threshold | Maximum number of RLC retransmissions during handover process |
| if a random access problem occurred in the source | After receiving handover configuration information from the source cell, when a random access problem occurs in the source cell | |
| if a beam failure was detected in the source | After receiving handover configuration information from the source cell, when a beam failure is detected in the source cell | |
| if indicators or counters (e.g. Qin, Qout) in the source was detected more than any (configurable) threshold | After receiving handover configuration information from the source cell, when the Qin or Qout value is detected more frequently than a configured threshold in the source cell | |
| if T304 has passed over any (configurable) threshold | When the T304 value is greater than a configured threshold | During handover process, information about the time from when the T304 timer starts until it stops |
| if the preamble retransmission to the target occurred more than any (configurable) threshold | After receiving handover configuration information from the source cell, when the number of preamble retransmissions in the target cell exceeds a configured threshold | Maximum number of preamble retransmissions during handover process |
| If the quality (e.g. RSRP, RSRQ of SSB/CSI-RS used for the preamble transmission in the target is worse than any (configurable) threshold | After receiving handover configuration information from the source cell, when the signal quality of the SSB or CSRI-RS used for preamble transmission in the target cell is not better than a configured threshold | Lowest signal quality during handover process |
| if number of contention in the target occurred more than any (configurable) threshold | After receiving handover configuration information from the source cell, when the number of occurrences of contention exceeds a configured threshold during random access in the target cell | Maximum number of occurrences of contention during handover process |
| Triggering Conditions for good HO | | |
| if the preamble transmission in the target occurred less than any (configurable) threshold | After receiving handover configuration information from the source cell, when the number of preamble retransmissions in the target cell is less than a configured threshold | Maximum number of preamble retransmissions during handover process |
| if number of contention in the target occurred less than any (configurable) threshold | After receiving handover configuration information from the source cell, when the number of occurrences of contention is less than a configured threshold during random access in the target cell | Maximum number of occurrences of contention during handover process |
| if handover completion time | The time required after receiving handover configuration information | Time required after receiving handover |

TABLE 2-continued

| Triggering Conditions | Description | Additionally logged information |
|---|---|---|
| since reception of HO command or HO execution is less than any (configurable) threshold | (conditional or DAPS HO) until the corresponding handover process is successfully completed is less than a configured threshold | configuration information until the corresponding handover process is successfully completed |
| if conditional handover completion time since HO execution or HO execution is less than any (configurable) threshold | The time required after conditional handover initiation until the corresponding conditional handover process is successfully completed is less than a configured threshold | Time required after receiving handover configuration information until the corresponding handover process is successfully completed |

For example, when successful HO reporting is configured and the handover is successfully completed, the information proposed in Table 2 may always be included as the content of the successful HO report. The information stored when a specific condition (e.g., Table 2) is satisfied during handover process or at the time of handover completion may be reported to the base station when the handover is successfully completed. If the handover is not successfully completed, the stored information may be deleted or may be considered as part of the content of an RLF report and reported to the base station through the RLF report.

As described above, handover types may include regular handover (e.g., first handover), conditional handover (e.g., second handover), and DAPS handover (e.g., third handover), and additional information may be included in the successful HO report according to the type of handover. For example, when DAPS handover is successfully completed, an indicator indicating whether an RLF has occurred in the source cell or information about an RLF having occurred in the source cell may be reported to the base station through a successful HO report. For example, when conditional handover is successfully completed, an indicator indicating whether the handover is completed through CHO failure recovery operation or information related to a first conditional handover failure may be reported to the base station through a successful HO report.

When the handover operation is successfully completed, the UE may report an indicator indicating that it stores successful HO report content to the target cell by using a specific RRC message (15-50). The UE may report the stored successful HO report to the target cell by including it in a UEInformationResponse message (15-60).

The successful HO report may be a separate reporting mechanism different from a legacy RLF report or may be defined as an improved RLF report that may also include information related to successful handover. For example, if it is a separate reporting mechanism different from a legacy RLF report, a separate availability indicator, a separate field for report requesting, and an IE for reporting may be defined in a UEInformationRequest message and in a UEInformationResponse message. If it is an improved RLF report, the UE can store only one of information about the most recent successful handover and information about the most recent RLF. When a new successful handover or a new RLF occurs, the UE may delete the previously stored information and store information related to a newly occurring event. Here, the availability indicator, the field for report requesting, and the IE for reporting are in common with the existing RLF report.

Upon receiving the successful HO report, the target cell may transmit the above information to the source cell or self-organizing/optimizing network (SON) server (15-65). The source cell or SON server may improve handover configuration information based on the above information.

When a specific condition is satisfied or a specific point in time is reached, the UE may delete the configuration information of a successful HO report and stored content of the successful HO report (15-75). For example, a specific condition or timing may be as follows.

When Successful HO Report has been successfully reported

When releasing current serving cell

Figure 16:
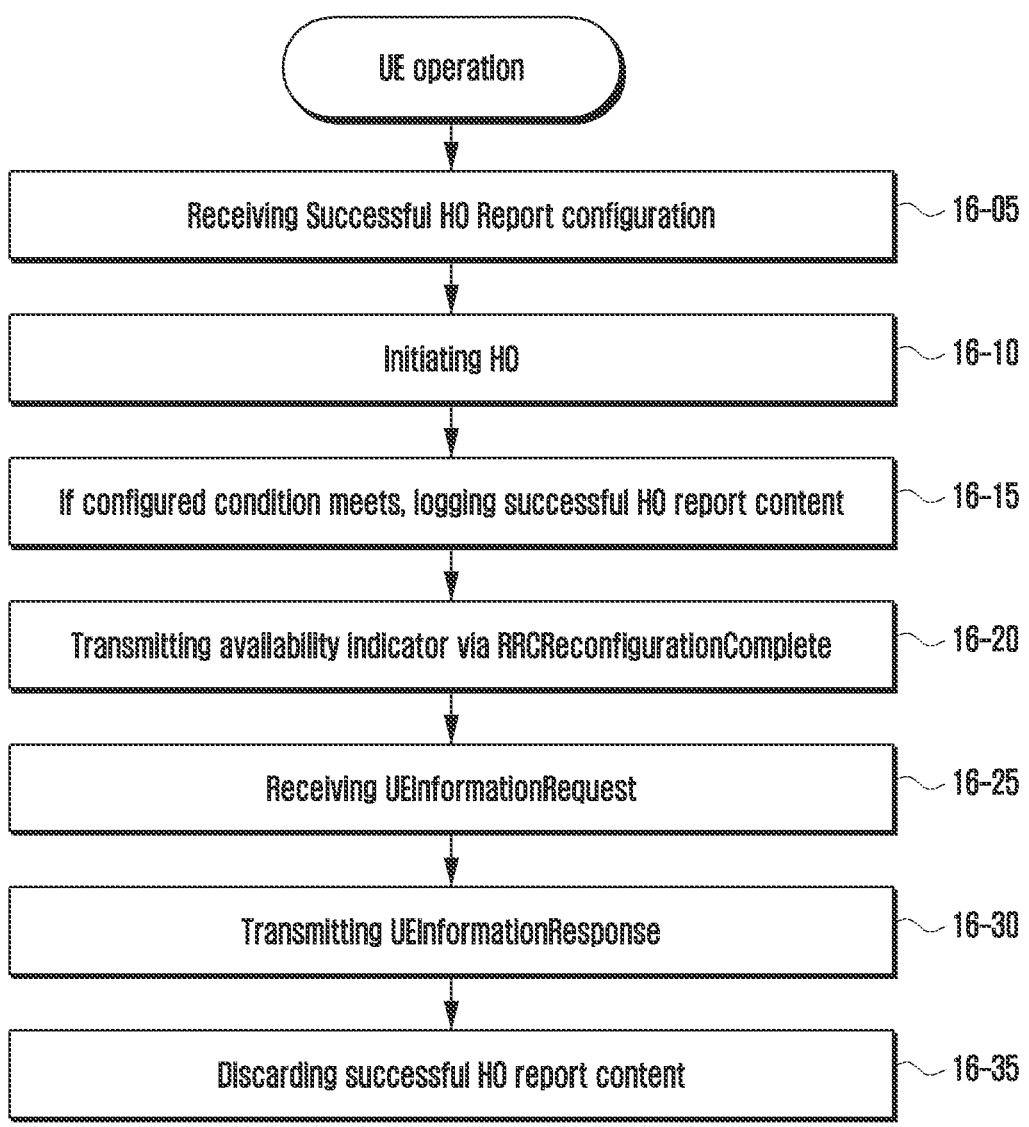
FIG. 16 is a diagram illustrating operations of the UE reporting a successfully completed handover according to an embodiment of the disclosure.

When new handover (i.e. not involved with the stored successful HO report) has been triggered (or successfully completed), while configuring new successful HO report Upon reestablishment, if the connected cell has the context of the UE, UE keeps the stored Successful HO Report, and sends its availability indicator via RRCReestablishmentComplete After x hours (e.g., 48 hours) since storing successful HO report content FIG. 16 is a diagram illustrating operations of the UE reporting a successfully completed handover according to an embodiment of the disclosure.

At step 16-05, the UE may receive successful HO report configuration information from the base station.

At step 16-10, the UE may trigger a handover.

At step 16-15, the UE may evaluate whether a condition set during the handover process is satisfied, and if the condition is satisfied, it may store specific information.

At step 16-20, the UE may report an indicator indicating that there is stored successful HO report content to the base station by using a specific RRC message. Alternatively, as the source cell and the target cell have previously performed coordination on the successful HO report, the UE may directly report a successful HO report to the target cell by using a specific RRC message without such an indicator.

At step 16-25, the UE may receive a successful HO report request from the base station.

At step 16-30, the UE may report a stored successful HO report to the base station. For example, the successful HO report may include at least one of the pieces of information in Table 2 above.

At step 16-35, the UE may delete the reported successful HO report content.

For example, the UE may delete successful HO report content when a specific condition is satisfied or a specific time point is reached. The specific condition or time point associated with deletion of successful HO report content may be at least one of i) when a successful HO report is successfully reported, ii) when the current serving cell is released, iii) while a new successful HO report is configured, when a new HO (i.e., not related to the saved successful HO report) is triggered (or, successfully completed), iv) upon reestablishment when the connected cell has the UE context and the UE maintains a stored successful HO report and transmits an availability indicator through RRCReestablishmentComplete, or v) after x hours (e.g., 48 hours) from the time when successful HO report content is stored.

In the embodiments of the disclosure, the elements included in the disclosure are expressed in a singular or plural form according to the proposed specific embodiment. However, the singular or plural expression is appropriately selected for ease of description according to the presented situation, and the disclosure is not limited to a single element or plural elements. Those elements described in a plural form may be configured as a single element, and those elements described in a singular form may be configured as plural elements.

Meanwhile, specific embodiments have been described in the detailed description of the disclosure, but various modifications are possible without departing from the scope of the disclosure. Therefore, the scope of the disclosure should not be limited to those described embodiments but should be defined by the appended claims and their equivalents.

The invention claimed is:

1. A method performed by a terminal in a wireless communication system, the method comprising:
receiving, from a source cell, configuration information related to a dual active protocol stack (DAPS) handover;
identifying, during the DAPS handover, a failure of a radio link with the source cell;
identifying whether at least one reference signal received power (RSRP) of synchronization signal blocks (SSBs) used for preamble transmissions to a target cell is lower than a first threshold;
in case that the at least one RSRP of the SSBs is lower than the first threshold, storing a lowest RSRP among the at least one RSRP in a handover report; and
transmitting, to the target cell, the handover report after the DAPS handover is completed, the handover report including the lowest RSRP and an indicator indicating the failure of the radio link with the source cell during the DAPS handover.

2. The method of claim 1, further comprising:
transmitting, to the target cell, time information between a reception of the configuration information and an occurrence of the failure of the radio link with the source cell.

3. The method of claim 1, further comprising:
identifying whether a number of preamble transmissions in the target cell is less than a second threshold; and
in case that the number of preamble transmissions in the target cell is less than the second threshold, storing a maximum number of preamble transmissions transmitted during the DAPS handover in the handover report.

4. The method of claim 3, further comprising:
in case that a time from receiving the configuration information until the DAPS handover is successfully completed is less than a fourth threshold, storing information on the time in the handover report.

5. The method of claim 1, further comprising:
deleting contents in the handover report based on another handover being triggered,
wherein during the DAPS handover means a time interval between receiving, from the source cell, the configuration information and transmitting, to the target cell, a radio resource control (RRC) reconfiguration complete message.

6. The method of claim 1, further comprising:
identifying whether a number of contentions occurred during a random access procedure in the target cell exceeds a third threshold; and
in case that the number of contentions exceeds the third threshold, storing a maximum number of contentions occurred during the DAPS handover in the handover report.

7. The method of claim 1,
wherein the handover report further includes information on indicating a cell in which a re-establishment attempt was made after the failure of the radio link.

8. A method performed by a target base station in a wireless communication system, the method comprising:
receiving, from a source cell, a request message associated with a dual active protocol stack (DAPS) handover;
transmitting, to the source cell, a message as a response to the request message;
performing, with a terminal, a random access procedure for the DAPS handover; and
receiving, from the terminal, a handover report after the DAPS handover is completed,
wherein in case that a failure of a radio link occurred at the source cell during the DAPS handover, the handover report includes an indicator indicating the failure of the radio link during the DAPS handover, and
wherein in case that at least one reference signal received power (RSRP) of synchronization signal blocks (SSBs) used for preamble transmissions of the random access procedure is lower than a first threshold, the handover report further includes a lowest RSRP among the at least one RSRP.

9. The method of claim 8, further comprising:
receiving, from the terminal, time information between transferring configuration information related to the DAPS handover from the source cell to the terminal and an occurrence of the failure of the radio link.

10. A terminal in a wireless communication system, the terminal comprising:
a transceiver to transmit and receive signals; and
a controller configured to:
receive, from a source cell, configuration information related to a dual active protocol stack (DAPS) handover,
identify, during the DAPS handover, a failure of a radio link with the source cell,
identify whether at least one reference signal received power (RSRP) of synchronization signal blocks (SSBs) used for preamble transmissions to a target cell is lower than a first threshold,
in case that the at least one RSRP of the SSBs is lower than the first threshold, store a lowest RSRP among the at least one RSRP in a handover report, and
transmit, to the target cell, the handover report after the DAPS handover is completed, the handover report including the lowest RSRP and an indicator indicating the failure of the radio link with the source cell during the DAPS handover.

11. The terminal of claim 10,
wherein the controller is further configured to transmit, to the target cell, time information between a reception of the configuration information and an occurrence of the failure of the radio link with the source cell.

12. A target base station in a wireless communication system, the target base station comprising:
a transceiver to transmit and receive signals; and
a controller configured to:
  receive, from a source cell, a request message associated with a dual active protocol stack (DAPS) handover,
  transmit, to the source cell, a message as a response to the request message,
  perform, with a terminal, a random access procedure for the DAPS handover, and
  receive, from the terminal, a handover report after the DAPS handover is completed,
wherein in case that a failure of a radio link occurred at the source cell during the DAPS handover, the handover report includes an indicator indicating the failure of the radio link during the DAPS handover, and
wherein in case that at least one reference signal received power (RSRP) of synchronization signal blocks (SSBs) used for preamble transmissions of the random access procedure is lower than a first threshold, the handover report further includes a lowest RSRP among the at least one RSRP.

13. The base station of claim 12,
wherein the controller is further configured to receive, from the terminal, time information between transferring configuration information related to the DAPS handover from the source cell to the terminal and an occurrence of the failure of the radio link.

* * * * *